United States Patent
Kanai

(10) Patent No.: US 7,170,634 B2
(45) Date of Patent: *Jan. 30, 2007

(54) PICTURE DISPLAY SYSTEM, PICTURE DATA PROCESSING METHOD, AND PROGRAM FOR PERFORMING COLOR CORRECTION OF OUTPUT PICTURES

(75) Inventor: Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 979 days.

This patent is subject to a terminal disclaimer.

(21) Appl. No.: 10/090,007

(22) Filed: Mar. 5, 2002

(65) Prior Publication Data

US 2002/0180999 A1  Dec. 5, 2002

(30) Foreign Application Priority Data

Mar. 6, 2001 (JP) ............................. 2001-061581

(51) Int. Cl.
- G06F 15/00 (2006.01)
- G03F 3/08 (2006.01)
- G06K 9/00 (2006.01)

(52) U.S. Cl. ...................... 358/1.9; 358/518; 358/3.23; 382/162; 382/167

(58) Field of Classification Search ................ 358/1.9, 358/518, 3.23; 382/162, 167; 345/600, 345/601, 602, 589, 593, 549, 690, 22
See application file for complete search history.

(56) References Cited

U.S. PATENT DOCUMENTS

| 5,600,764 | A | 2/1997 | Kakutani |
|---|---|---|---|
| 6,480,202 | B1 | 11/2002 | Deguchi et al. |
| 6,847,374 | B2 | 1/2005 | Matsuda |
| 2002/0097907 | A1 | 7/2002 | Fukasawa |
| 2002/0180999 | A1 | 12/2002 | Kanai |
| 2003/0035157 | A1 | 2/2003 | Kanai |
| 2003/0053088 | A1 | 3/2003 | Kanai et al. |
| 2004/0036896 | A1 | 2/2004 | Yamauchi et al. |

FOREIGN PATENT DOCUMENTS

| EP | 1178672 A2 * | 2/2002 |
|---|---|---|
| EP | 1 178 672 A2 | 6/2002 |
| EP | 1 178 680 A2 | 6/2002 |
| JP | 01-103445 | 4/1989 |
| JP | 04-073760 | 3/1992 |
| JP | 04-136925 A | 5/1992 |
| JP | 04-181871 | 6/1992 |

(Continued)

Primary Examiner—Kimberly Williams
Assistant Examiner—Charlotte M. Baker
(74) Attorney, Agent, or Firm—Lowe Hauptman & Berner LLP

(57) ABSTRACT

In an image display device, which performs a desired image processing for inputted image data and displays an image, a desired color correction is performed for the inputted image data by a first color corrector (110) on the basis of a characteristic value of the image display device and by reference to a three-dimensional color correction table. The three-dimensional color correction table is configured for matching color characteristics of the image display device to reference color characteristics. Further, a desired color correction is performed for the inputted image data by a second color corrector by reference to a one-dimensional color correction table which is configured for performing a color correction according to an external environment.

11 Claims, 22 Drawing Sheets

FOREIGN PATENT DOCUMENTS

| | | |
|---|---|---|
| JP | 8 65701 | 3/1996 |
| JP | 08-065701 A | 3/1996 |
| JP | 09-271036 A | 10/1997 |
| JP | 10-65930 | 3/1998 |
| JP | 10-198793 A | 7/1998 |
| JP | 11-069370 A | 3/1999 |
| JP | 11 175048 | 7/1999 |
| JP | 11 205620 A | 7/1999 |
| JP | 2001-8045 A | 1/2001 |
| JP | 2001-14448 | 1/2001 |
| JP | 2001-060082 | 3/2001 |
| JP | 2002-27272 | 1/2002 |
| JP | 2002-41016 | 2/2002 |
| JP | 2002-262304 | 9/2002 |
| WO | 99/23637 | 2/1998 |

* cited by examiner

PICTURE DISPLAY SYSTEM, PICTURE DATA PROCESSING METHOD, AND PROGRAM FOR PERFORMING COLOR CORRECTION OF OUTPUT PICTURES

BACKGROUND OF THE INVENTION

1. Field of the Invention

The present invention relates to an image display device and an image processing method, wherein a desired color compensation is performed for an output image, as well as a program used therefor.

2. Related Art

In the case of an image display device such as a projector, the color of a displayed image may change because a color reproduction region differs depending on the type of the display device used. To avoid this inconvenience, there usually is performed a processing called color matching for matching color characteristics of the image display device used to color characteristics of a conventional CRT monitor.

Further, in case of using an image display device such as a projector, it is important that an image intended by a producer be reproducible even if an external environment changes. Particularly, unless a change in brightness or color of external illumination or a change in color of a projection plane is taken into account as a change in external environment, it is difficult to make an appropriate reproduction of color.

For the aforesaid color matching and correction against the external environment there usually is employed a color correction table.

SUMMARY OF INVENTION

However, in the case of such an image display device as a projector, it is difficult to store a lot of data on a color correction table, due to a restriction imposed on the memory capacity. More particularly, in the case of a projector, it is necessary to store a suitable color correction table for each projector because of a significant difference between individual projectors.

The present invention has been accomplished for solving the above-mentioned problem and it is an object of the invention to provide an image display device, an image processing method, and a program, which can reproduce color appropriately while saving the capacity of memory.

According to the present invention, an image display device for performing an image processing for an inputted image data, includes: a first color correction section which performs a desire color correction for the inputted image data on the basis of a characteristic value of the image display device and by reference to a three-dimensional color correction table, the three-dimensional color correction table being for matching color characteristics of the image display device to reference color characteristics; and a second color correction section table being for making a color correction according to an external environment.

According to the thus constructed image display device for performing an image processing for an inputted image data, by the first color correction section a desired color correction for the inputted image data is performed on the basis of a characteristic value of the image display device and by reference to a three-dimensional color correction table, the three-dimensional color correction table being for matching color characteristics of the image display device to reference color characteristics. Therefore, by the second color correction section a desired color correction for the inputted image data is performed by reference to a one-dimensional color correction table, the one-dimensional color correction table being for making a color correction according to an external environment.

According to the present invention the first color correction section is provided with a rewrite section for rewriting lattice point data of the three-dimensional color correction table on the basis of the characteristic value.

According to the present invention the one-dimensional color correction table used in the second color correction section is for adjusting the color temperature.

According to the present invention the one-dimensional color correction table used in the second color correction section is for correction responsive to a change in brightness of an external illumination.

According to the present invention the one-dimensional color correction table used in the second correction section is for correction responsive to a change in color of a projection plane.

According to the present invention the one-dimensional color correction table used in the second color correction section is for correction responsive to a change in color of an external illumination.

According to the present invention a section for inputting the characteristic value is further included.

According to the present invention the image display device is a projector.

According to the present invention the rewrite of lattice point data by the rewrite section is not performed when the characteristic value is a characteristic reference value.

According to the present invention an image display method for performing an image processing for an inputted image data, includes: a first color correction step which performs a desired color correction for the inputted image data on the basis of a characteristic value of the image display device and by reference to a three-dimensional color correction table, the three-dimensional color correction table being for matching color characteristics of the image display device to reference color characteristics; and a second color correction step which performs a desired color correction for the inputted image data by reference to a one-dimensional color correction table, the one-dimensional color correction table being for making a color correction according to an external environment.

According to the present invention provided is a computer-program of instructions for execution by the computer to perform an image processing for an inputted image data, the image processing including: a first color correction processing which performs a desired color correction for the inputted image data on the basis of a characteristic value of the image display device and by reference to a three-dimensional color correction table, the three-dimensional color correction table being for matching color characteristics of the image display device to reference color characteristics; and a second color correction processing which performs a desired color correction for the inputted image data by reference to a one-dimensional color correction table, the one-dimensional color correction table being for making a color correction according to an external environment.

DESCRIPTION OF THE PREFERRED EMBODIMENTS

Preferred embodiments of the present invention are described hereinafter with reference to the drawings.

First Embodiment

System Configuration

Figure 1:
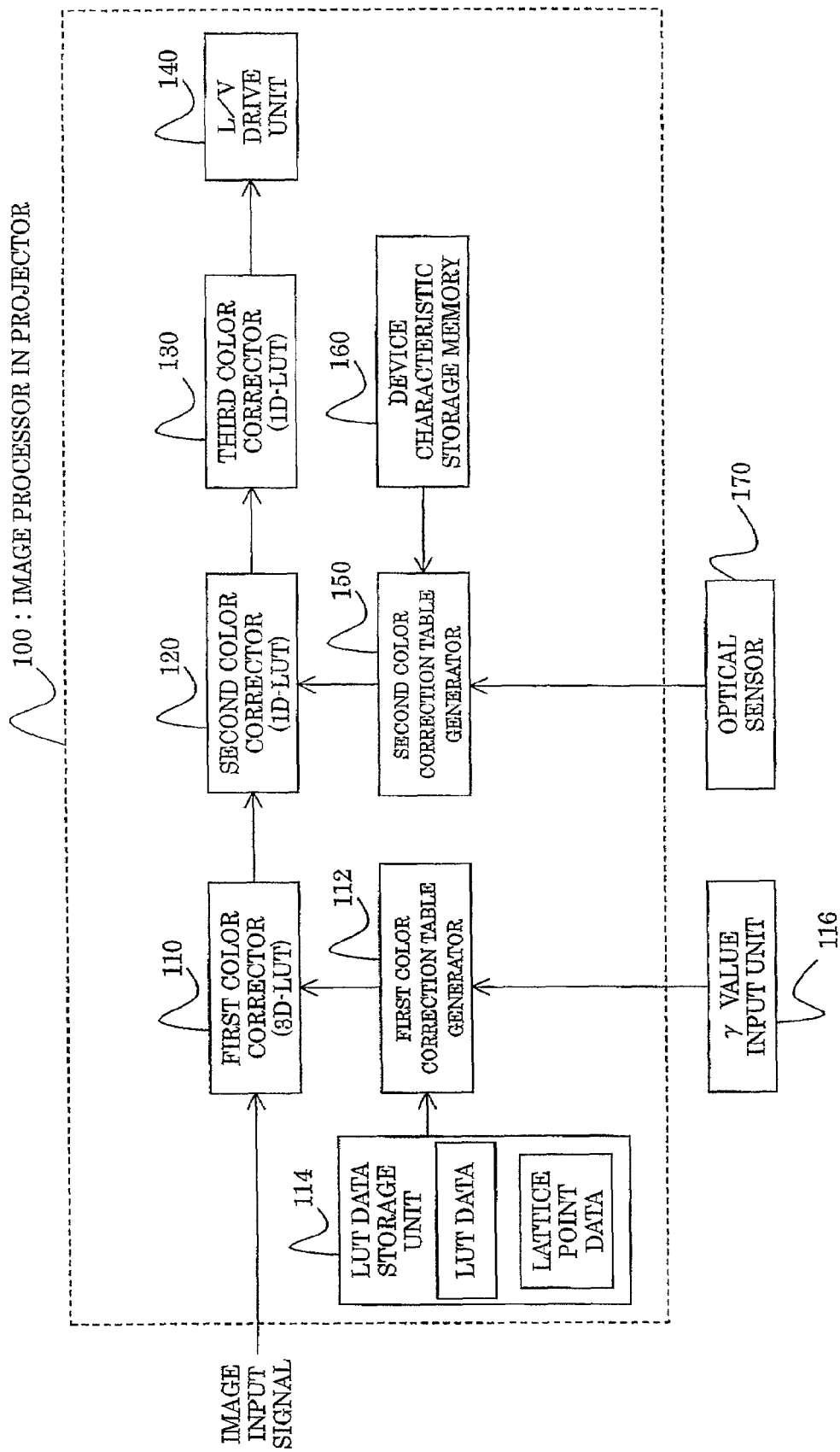
FIG. 1 is a functional block diagram of an image processor disposed within a projector according to a first embodiment of the present invention.

FIG. 1 is a schematic explanatory diagram of a system which uses a projector 20 as an image display device according to an embodiment of the present invention. As examples of the image display device according to the present invention are also included CRT and liquid crystal display in addition to the projector.

An image processor 100 disposed within a projector according to a first embodiment of the present invention is provided with a first color corrector 110 which performs color matching on the basis of a color correction table generated by a first color correction table generator 112, a second color corrector 120 which performs a desired color correction on the basis of a color correction table generated by a second color correction table generator 150, a third color corrector 130 for adjusting output characteristics of a liquid crystal light valve (L/V), and a L/V drive section 140 for actuating the liquid crystal light valve to make a projection display of image.

The image processor 100 is also provided with a γ value input section 116 for the input of a γ value of the projector, a LUT data storage section 114 which stores data (conversion values, LUT data) present in a color correction table and lattice point data in a correlated manner, the LUT data being for generating a three-dimensional color correction table (3D-LUT) for color matching, and the first color correction table generator 112 which is for generating the three-dimensional color correction table for color matching on the basis of both γ value inputted by the γ value input section 116 and the data stored in the LUT data storage section 114.

The image processor 100 is further provided with a device characteristic storage memory 160 for the storage of color characteristic information of the projector when outputted to a reference projection plane within a dark room, an optical sensor 170 for measuring the luminance of light emitted from the projector and reflected by the screen and light from the external illumination reflected by the screen, and the second color correction table generator 150 for generating a one-dimensional color correction table (1D-LUT) taking the influence of external illumination into account and on the basis of both colorimetric value obtained by the optical sensor 170 and information stored in the device characteristic storage memory.

In the projector of this first embodiment, first with reference to the color correction table generated by the first color correction table generator 112, color matching is performed by the first color corrector 110 for an input image signal fed from a personal computer for example. Next, with reference to the color correction table generated by the second color correction table generator 150, the thus color-matched image signal is subjected to a desired color correction by the second color correction table 120 taking the influence of external illumination into account. The image signal thus color-corrected is adjusted by the third color corrector 130 taking the output characteristics of the liquid crystal light valve into account. In accordance with an analog signal thus adjusted, the L/V drive section 140 actuates the liquid crystal light value to make a projection display of image.

Processings such as a color correction table generation/rewrite processing performed by the image processor 100, which is described below, are carried out by executing an image processing program stored in a program storage section (not shown) provided in the projector. The program storage section constitutes a medium which stores the image processing program. The image processing program itself is also included in the scope of the present invention.

(1) Color Correction in the First Color Corrector 110

The first color corrector 110 performs color matching on the basis of a three-dimensional color correction table generated in the following manner by the first color correction table generator 112.

(1-1) Processing by the First Color Correction Table Generator 112

Now, with reference to FIG. 3, a description is given below about the color correction table generating process carried out by the first color correction table generator 112.

First, upon input of a γ value (projector characteristic value) of the projector from the γ value input section 116 (S10, Yes), both intra-table data (conversion values, LUT data) and lattice point data stored in the LUT data storage section 114 which is disposed within a ROM of the projector are read into a RAM (S 12).

On the basis of the inputted γ value, the first color correction table generator 112 rewrites the lattice point data (S14). Since the intra-table data stored in the LUT data storage section 114 are prepared for a projector with a γ value of 2.2 (characteristic reference value), it is necessary to rewrite the lattice point data on the basis of the projector's γ value. More specifically, lattice point values (R, G, B) are converted to (R', G', B') on the basis of the inputted γ value and in accordance with:

$$R' = R^{2.2/\gamma}$$

$$G' = R^{2.2/\gamma}$$

$$B' = B^{2.2/\gamma}$$

The first color correction table generator 112 associates the converted lattice point values (R', G', B') with the intra-table conversion values stored in the LUT data storage section 114 and generates a new three-dimensional color correction table (S16), then sets the thus-generated three-dimensional color correction table to the first color corrector 110 (S18) and terminates the processing.

Constructing the first color corrector such that one three-dimensional color correction table is stored and lattice point data are rewritten on the basis of a γ value of the projector, is for saving the memory capacity because a larger memory capacity is required for storing the three-dimensional correction table in comparison with the one-dimensional color correction table.

(1-2) Processing for Generating LUT Data Stored in the LUT Data Storage Section 114

Figure 4:
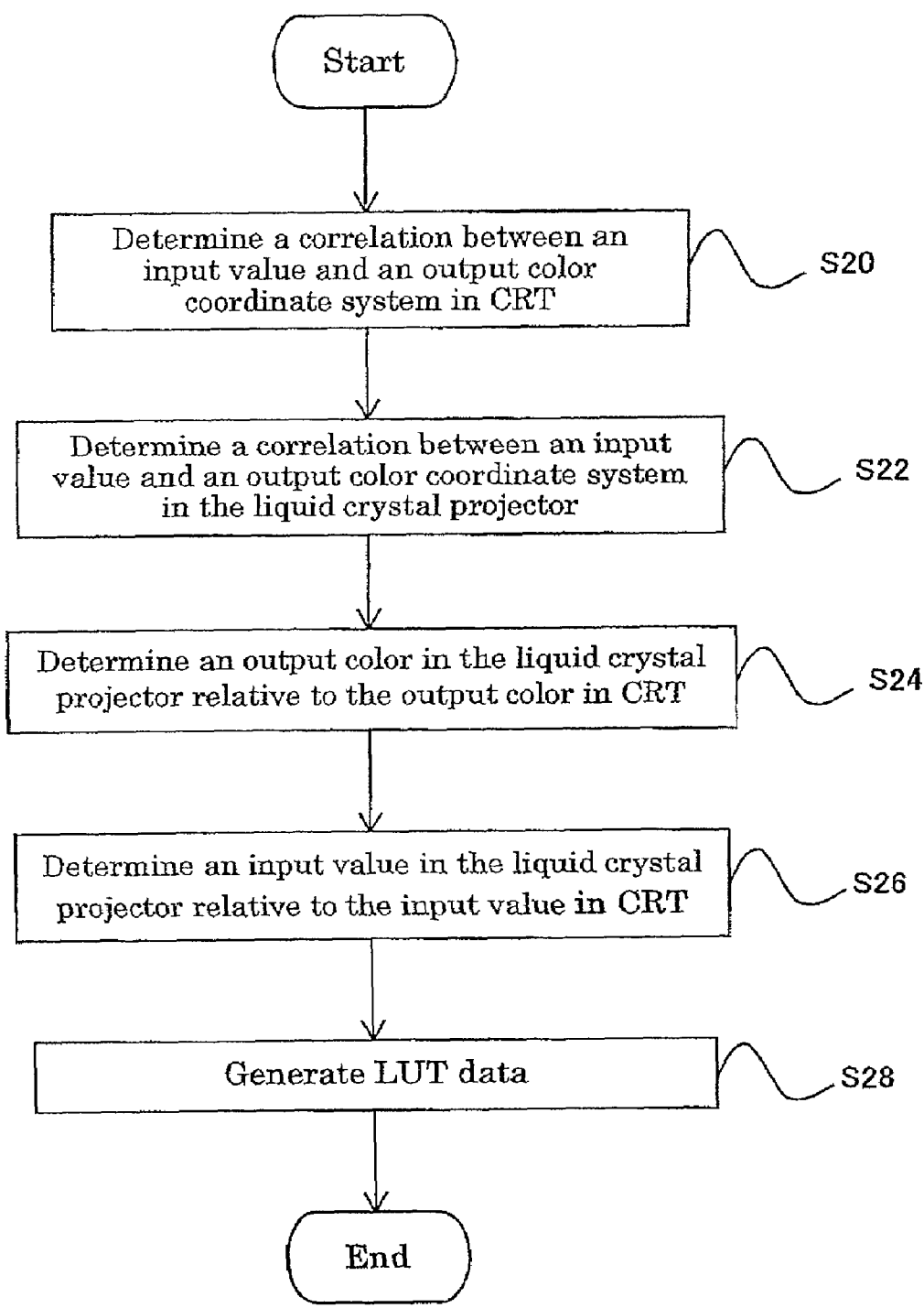
FIG. 4 is a flow chart for explaining a LUT data generating process which data are stored in a LUT data storage section 114.

Next, with reference to FIG. 4, a description is given below about a processing for generating LUT data stored in the LUT data storage section 114. The following description in this embodiment is of the case where color characteristics of the projector are to be matched to color characteristics (reference color characteristics) of CRT.

First, a correlation is determined between input values $(R_c G_c B_c)$ in a CRT and color coordinates (e.g., $X_c Y_c Z_c$, $L_c^* a_c^* b_c^*$) of an output color (S20). With respect to a typical color, a correlation thereof is determined by outputting the color actually from the CRT and measuring the outputted light. As to remaining colors, their correlations are determined by an interpolating calculation for example Then, a correlation is determined between an input value $(R_p G_p B_p)$ in the projector and color coordinates (e.g., $X_p Y_p Z_p$, $L_p^* a_p^* b_p^*$) (S22) of an output color. Likewise, with respect to a typical color, a correlation thereof is determined by outputting the color actually from the projector and measuring the outputted light. As to remaining colors, their correlations are determined by an interpolating calculation for example.

Figure 6:
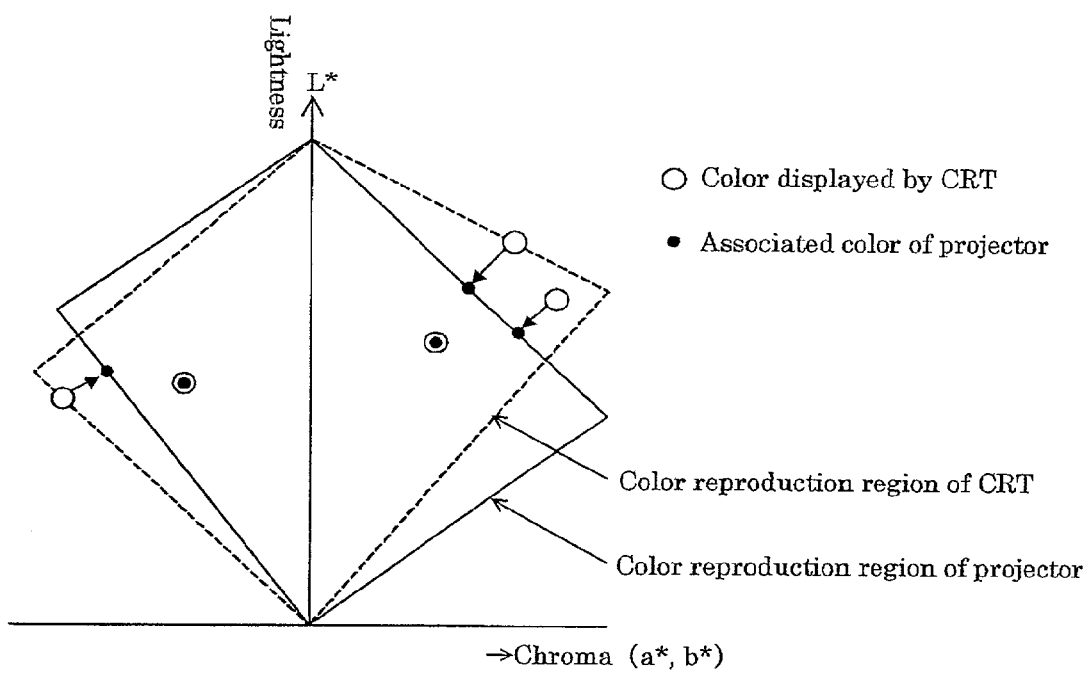
FIG. 6 is a diagram for explaining a correlation between CRT colors and projector colors.

Next, there is determined an output color $(L_p^* a_p^* b_p^*)$ of the liquid crystal projector relative to an output color $(L_c^* a_c^* b_c^*)$ of CRT (S24). Usually, the same colors $(L_c^* = L_p^*, a_c^* = a_p^*, b_c^* = b_p^*)$ are mutually correlated. However, if the output color $(L_c^* a_c^* b_c^*)$ of CRT is a color which cannot be outputted by the projector, a color relatively close to the output color, (e.g., a color which is the same in hue and the smallest in the distance on color coordinates with respect to the output color), among colors capable of being outputted by the projector, is selected and determined for correlation, as shown in FIG. 6.

Figure 5:
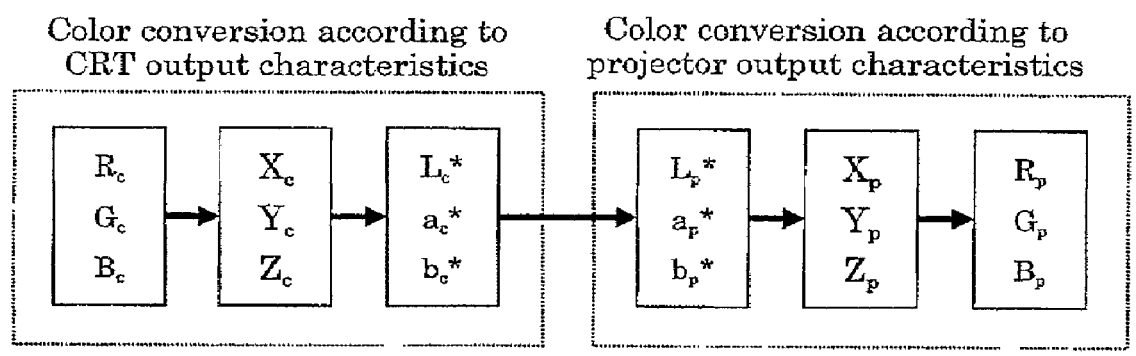
FIG. 5 is a diagram for explaining the LUT data generating process.

Then, as shown in FIG. 5, $R_p G_p B_p$ values for $R_c G_c B_c$ values are determined on the basis of the correlations obtained in steps S20–S26 and LUT data are prepared (S28).

In this embodiment it is assumed that the LUT data thus prepared and lattice point data are stored beforehand in the LUT data storage section 114.

(2) Color Correction in the Second Color Corrector 120 (Color Correction Taking Changes in the External Environment into Account)

Figure 7:
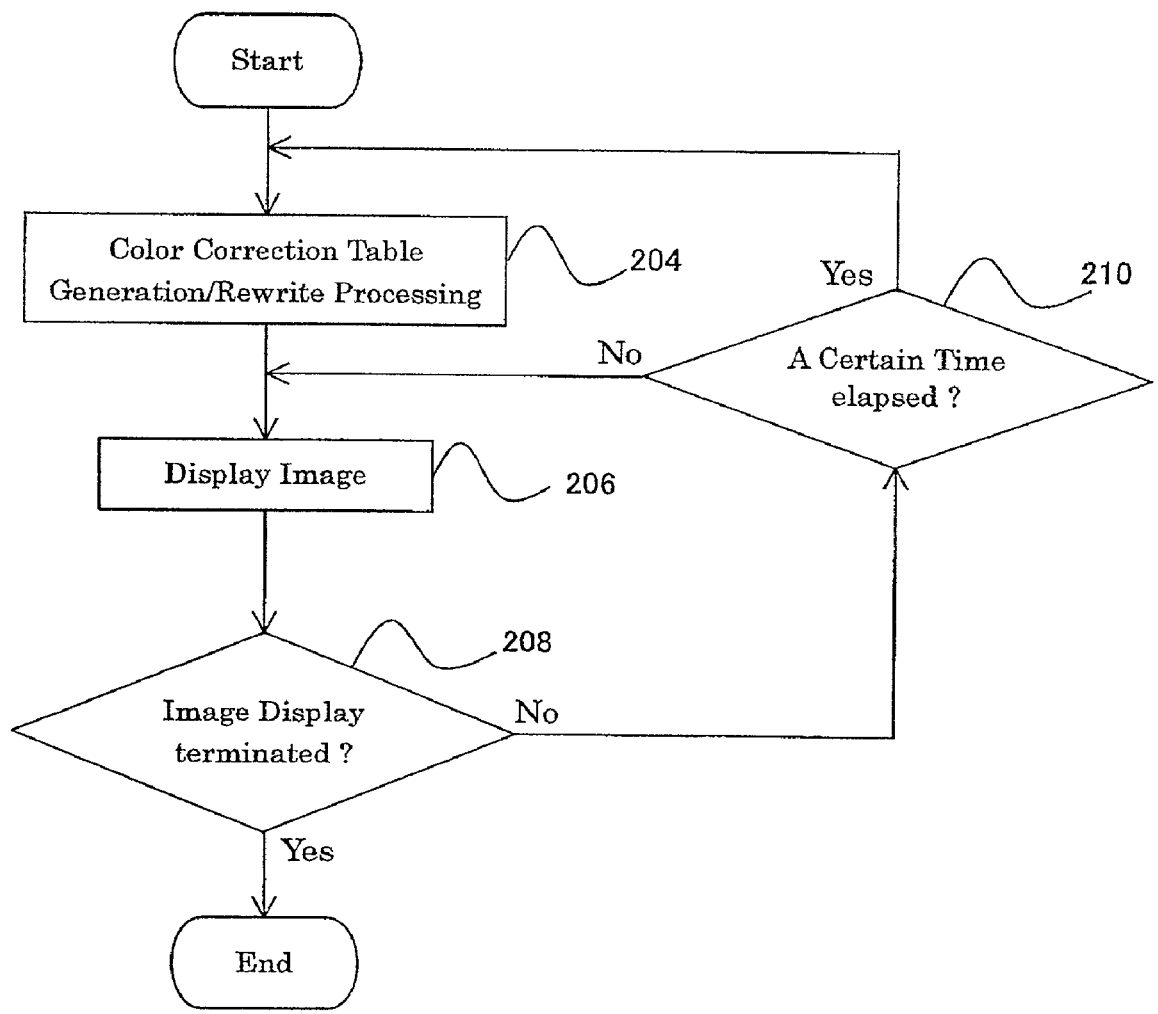
FIG. 7 is a flow chart for explaining the operation of the second color corrector 120 in the projector of the first embodiment.

(2-1) Color Correction Taking Changes in External Illumination and Projection Plane into Account Next, with reference to FIG. 7, the following description is provided about the operation of the second color corrector 120 in the projector according to the first embodiment of the present invention.

First, when the use of the projector according to the present invention is started, there is performed a color correction table generation/rewrite processing by the second color correction table generator 150 (step 204) As to the color correction table generation/rewrite processing, it will be described below in detail with reference to FIG. 8.

After the color correction table generation/rewrite processing, there is made image display on the basis of the image signal color-corrected by the second color corrector 120 and with reference to the rewritten color correction table (step 206). If the image display is not terminated (step 208, No) and if a certain time has not elapsed from the end of the last-time color correction table generation/rewrite processing (step 210, No), the state of image display in step 206 continues. On the other hand, if the display of image is not terminated (step 208, No) and a certain time has elapsed from the termination of the last-time color correction table generation/rewrite processing (step 210, Yes), the color correction table generation/rewrite processing is again performed taking into account the case where the brightness of external illumination changes with the lapse of time (step 204) and there is made image display (step 206). According to the present invention, since the color correction table is rewritten at every certain time taking the brightness or color of external illumination or the color of projection plane also into account, an appropriate color reproduction is ensured even if the brightness or color of external illumination or the color of the projection plane changes.

In the case where the display of image is terminated, for example by turning OFF a power supply of the projector (step 208, Yes), the processing is ended.

Color Correction Table Generation/Rewrite Processing

Figure 8:
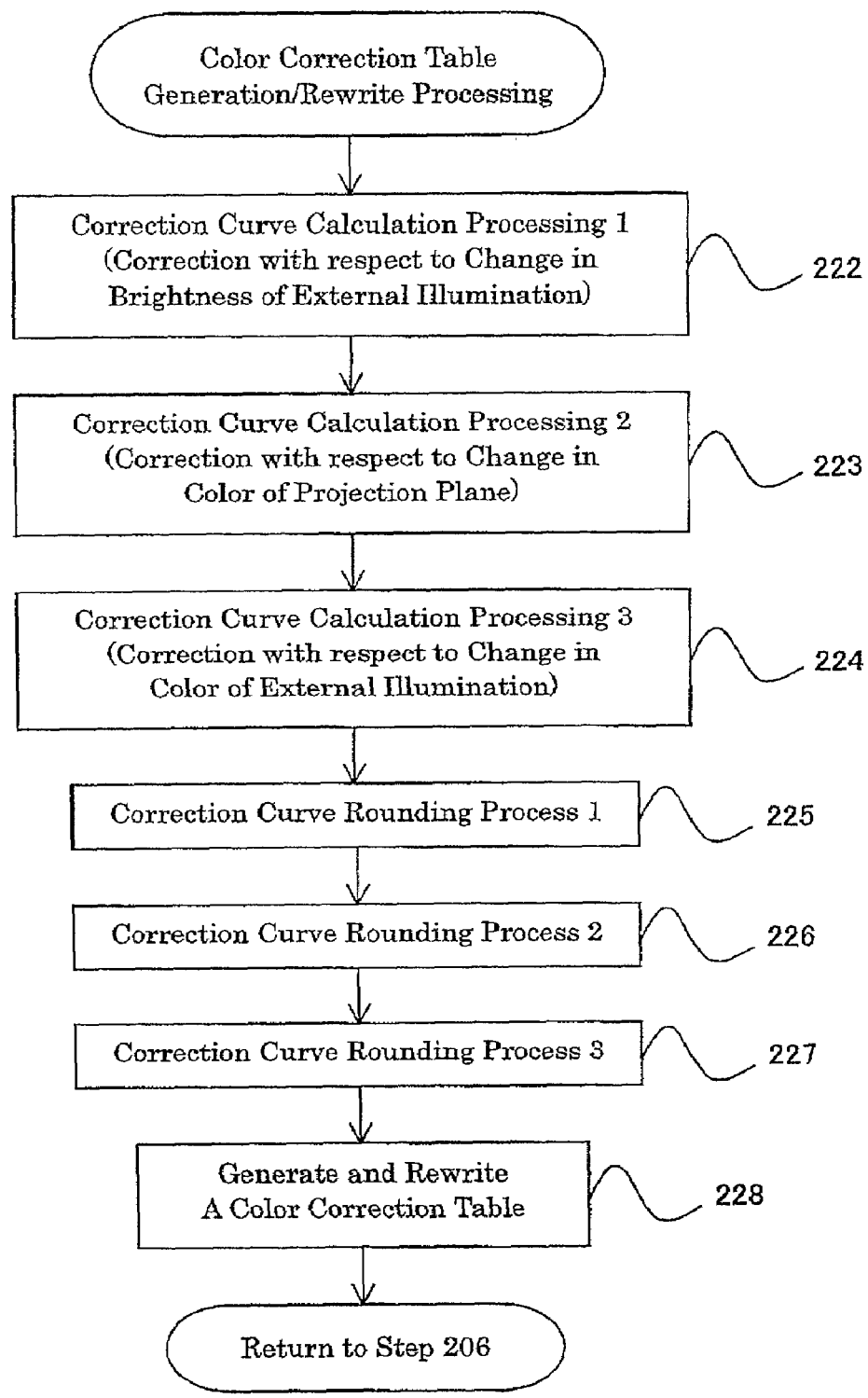
FIG. 8 is a flow chart for explaining a color correction table generation/rewrite processing executed by a second color correction table generator 150 in the projector of the first embodiment.

Next, with reference to FIG. 8, a description is given about the color correction table generation/rewrite processing (the processing in step 204 in FIG. 7) which is performed by the second color correction table generator 150 in the projector of the first embodiment.

In the color correction table generation/rewrite processing, a correction curve calculation processing 1 (a correction with respect to change in brightness of external illumination) (step 222), a correction curve calculation processing 2 (a correction with respect to change in color of projection plane) (step 223), and a correction curve calculation processing 3 (a correction with respect to change in color of external illumination) (step 224) are respectively performed. Next, three steps of correction curve rounding processes 1, 2 and 3 are performed (steps225, 226 and 227). The correction curve calculation processings 1, 2 and 3 and the correction curve rounding processes 1, 2 and 3 will be explained hereinafter.

Next, on the basis of the correction curves thus calculated, there is generated a new one-dimensional color correction table. Then, the one-dimensional color correction table, which is referred to in the second color corrector 120, is rewritten by the newly generated one-dimensional color correction table (step 228), and the processing flow returns to step 206.

Correction Curve Calculation Processing 1

(Correction with Respect to Change in Brightness of External Illumination)

Figure 9:
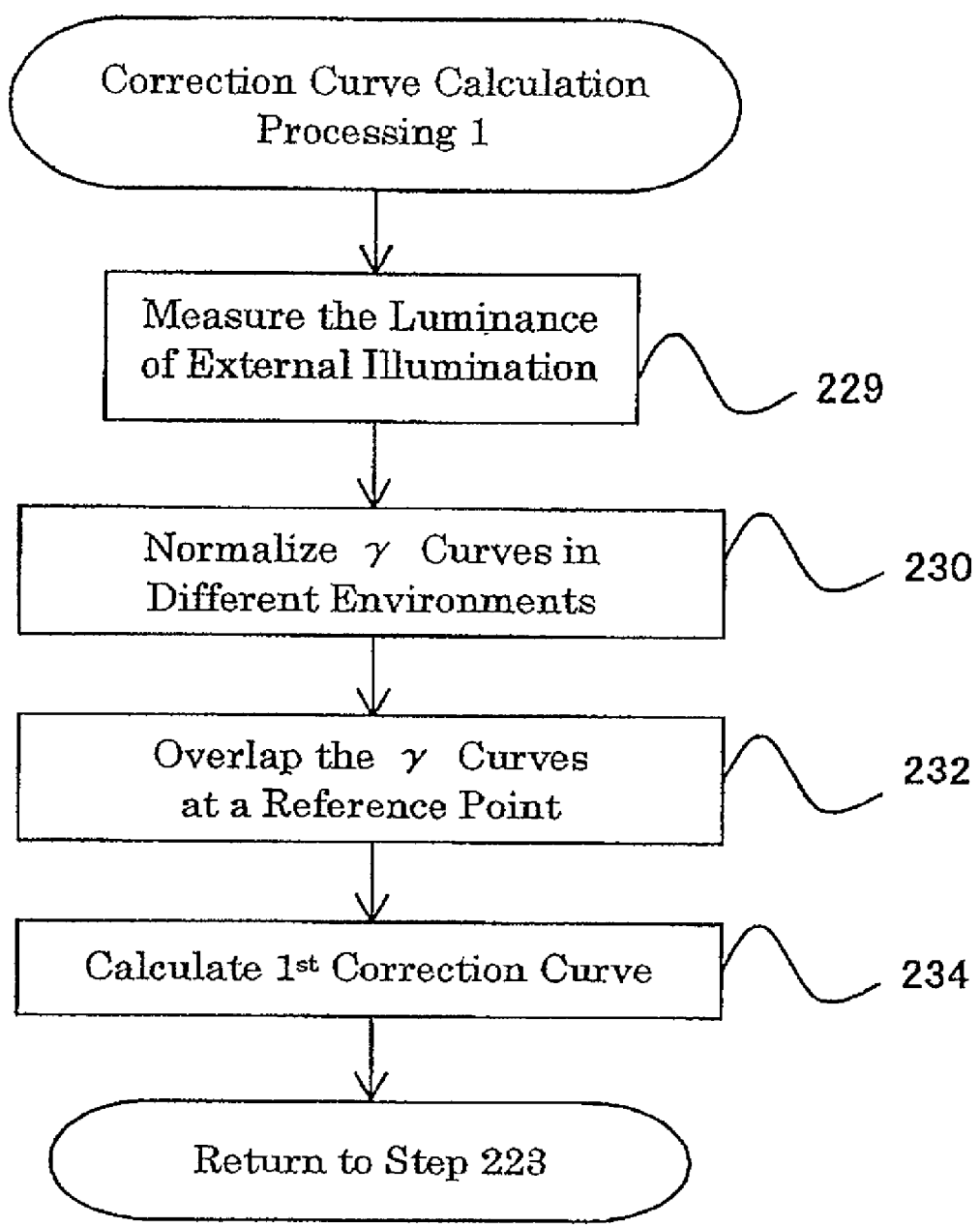
FIG. 9 is a flow chart for explaining a correction curve calculation processing 1 (a correction with respect to a change in brightness of external illumination)

Next, a description is given about a correction curve calculation processing 1 with reference to FIG. 9.

In the color correction table generation/rewrite processing 1, the projector (image display device) 20 is caused to output white (R=G=B=255 gray scales) in a dark surround beforehand, the output light is allowed to be reflected by the screen 10, and the reflected light is measured by the optical sensor 170.

In the color correction table generation/rewrite processing 1, with no output from the projector 20, the luminance of external illumination light reflected by the screen 10 is measured (step 229).

Next, tone curves are normalized in different environments (step 230). Correction curves in all of W (white), R (red), G (green), and B (blue) are the same curves, and therefore, in this embodiment a correction curve is calculated with respect to W as an example. γ curves in different environments (in a dark surround and in an illuminated surround) are assumed as follows. The "γ" represents a tone curve characteristic of the projector concerned. The value of γ is obtained by actually measuring the tone curve characteristic of the projector concerned and it is suitable to use a mean value as the value of γ. In this embodiment, γ is set equal to 2.2 as an example.

In a dark surround:

$$Fd(Din)=Yw \cdot Din^\gamma \qquad (1)$$

Figure 10:
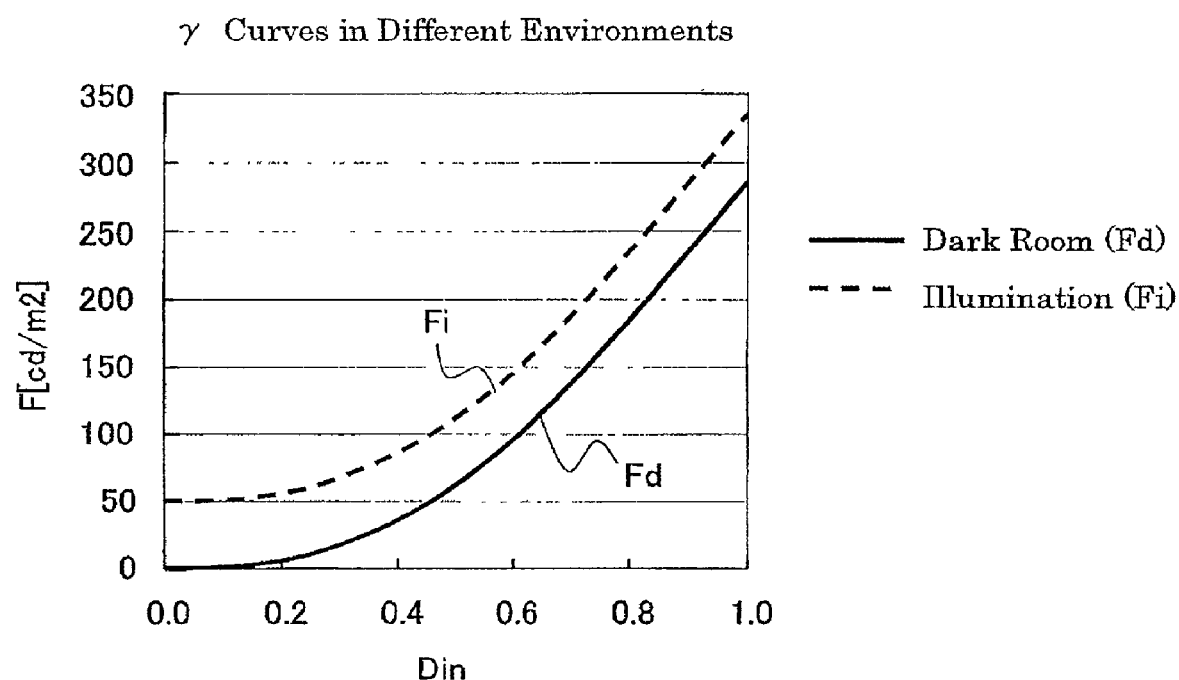
FIG. 10 is a graph showing γ curves in different environments.

In an illuminated surround:

$$Fi(Din)=Yw \cdot Din^\gamma+Yi \qquad (2)$$

tone curves in different environments are shown in FIG. 10.

In the above equations, F represents a total luminance of lights reflected by the screen, Din represents normalized values 0–1 by normalizing digital input values (0–255 gray scales) of RGB, Yw represents the luminance of white in the projection, and Yi represents the luminance of illumination. Then, the equations (1) and (2) are normalized under the assumption that the eyes adapt themselves to luminances (Yw in a dark surround, Yw+Yi in an illuminated surround) detected when the projector outputs white in different environments. That is, the equations (1) and (2) are normalized so that the luminance (Yw in a dark surround, Yw+Yi in an illuminated surround) detected when the projector outputs white in each of different environments becomes 1. More specifically:

In a dark surround:

$$F'd(Din)=Fd(Din)/Yw=Din^\gamma \qquad (3)$$

In an illuminated surround:

$$F'i(Din)=Fi(Din)/(Yw+Yi)=(Yw \cdot Din^\gamma+Yi)/(Yw+Yi) \qquad (4)$$

Figure 11:
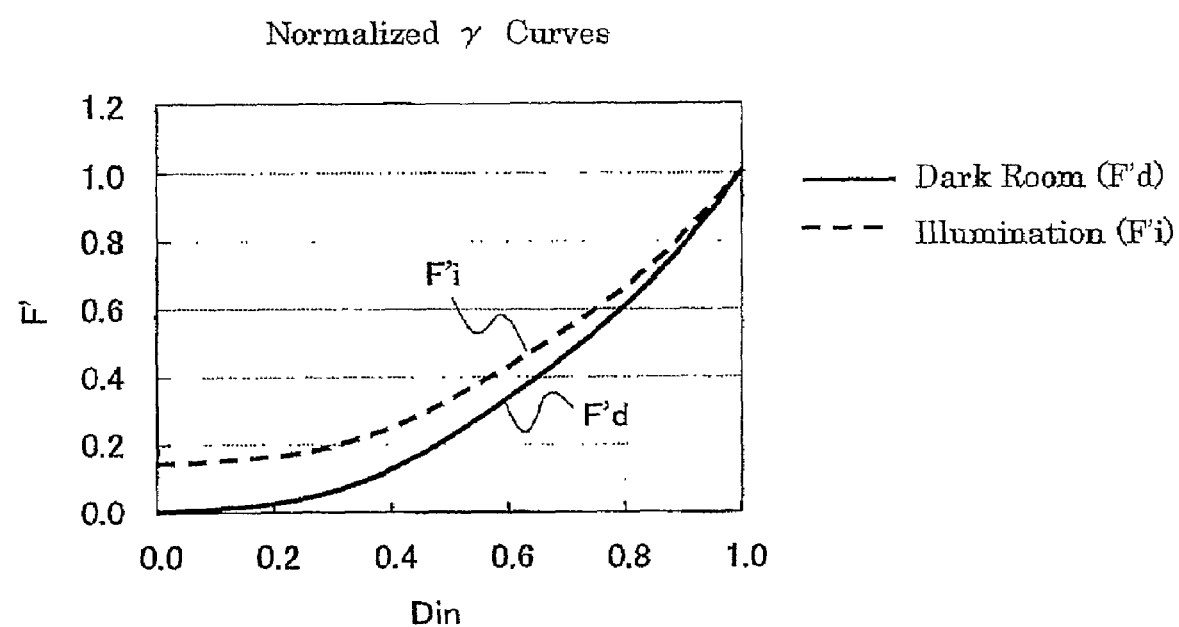
FIG. 11 is a graph showing normalized γ curves in different environments.

Normalized γ curves in different environments are shown in FIG. 11.

Figure 12:
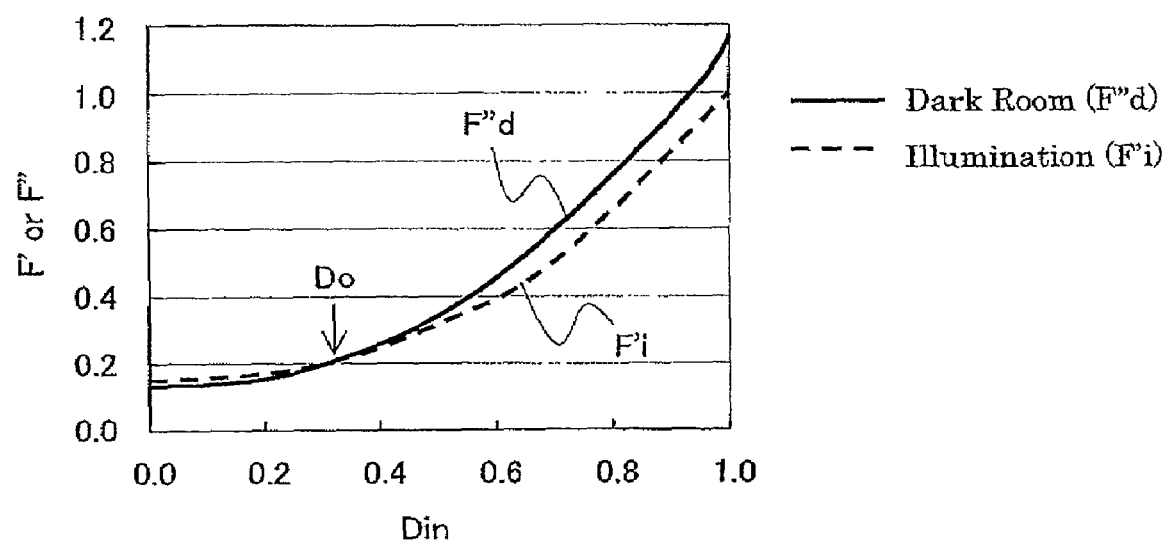
FIG. 12 is a graph showing a state in which normalized γ curves in different environments are overlapped together at a reference point Do.

Next, the γ curves are overlapped each other at a reference point Do (step 232). As shown in FIG. 12, F'd(Din) is shifted in parallel in F' axis direction by only {F'i(Do)−F'd(Do)} so that F'd(Din) takes the same value as F'i(Din) More specifically:

$$F''d(Din) = F'd(Din) + \{F'i(Do) - F'd(Do)\}$$
$$= F'd(Din) - F'd(Do) + F'i(Do)$$

If the equations (3) and (4) are used:

$$F''d(Din)=Din^\gamma-Do^\gamma+(Yw \cdot Do^\gamma+Yi)/(Yw+Yi) \qquad (5)$$

Then, using the equation (5), a $1^{st}$ correction curve is calculated (step 234).

Thus, in this embodiment, as shown in FIG. 12, a $1^{st}$ correction curve is formed so that an output value of the correction curve in an illuminated surround coincides with an output value of the correction curve in a dark surround in the vicinity of the reference point Do.

Then, the change in color of output image, which depends on whether an external illumination is present or not, is diminished by correcting input tone values so that a relative contrast (gradient of tone curve) in the vicinity of the reference point Do does not change depending on whether an external illumination is present or not.

The above can be expressed by the following equation:

$$F'i(Dout1)=F''d(Din) \qquad (6)$$

where Dout1 represents input tone values corrected by the $1^{st}$ correction curve.

Substitution of equations (4) and (5) into equation (6) gives:

$$(Yw \cdot Dout1^\gamma+Yi)/(Yw+Yi)=Din^\gamma-Do^\gamma+(Yw \cdot Do^\gamma+Yi)/(Yw+Yi)$$

Thus, $$Dout1=[(1+Yi/Yw)Din^\gamma-(Yi/Yw)Do^\gamma]^{1/\gamma} \qquad (7)$$

Figure 13:
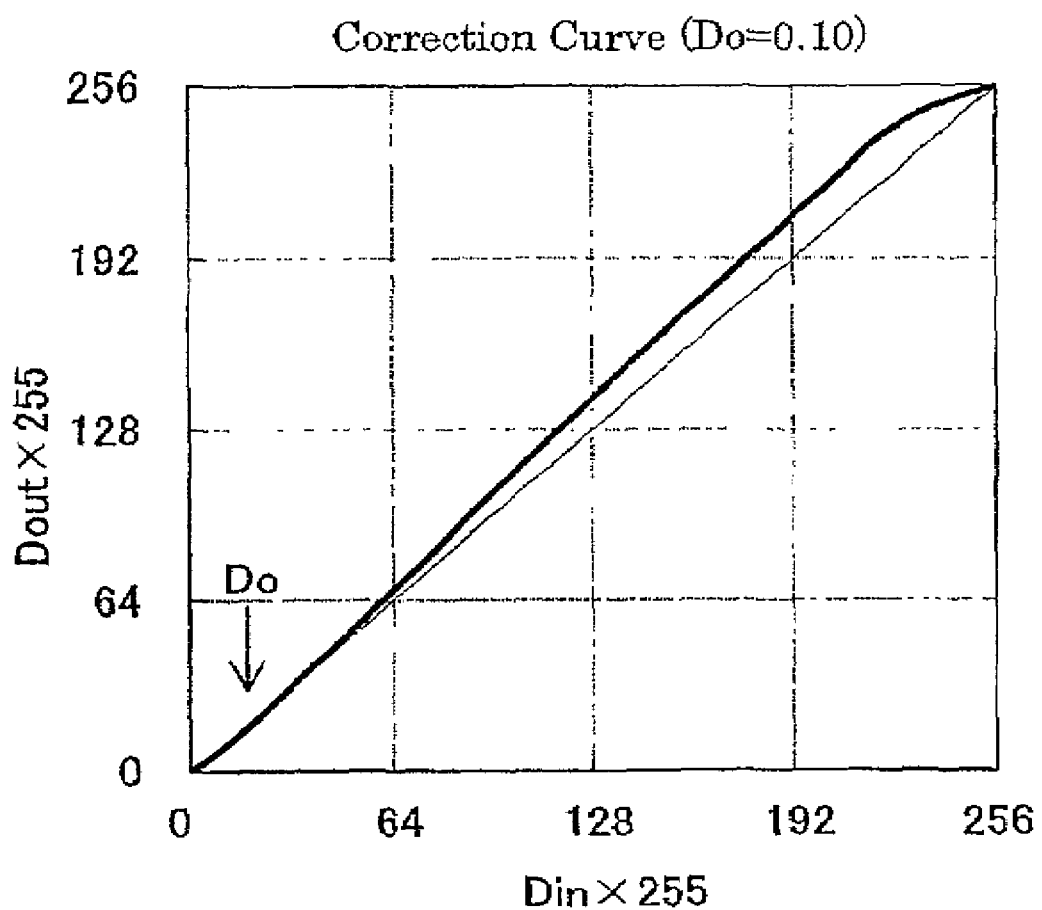
FIG. 13 is a graph (1) showing an example of a correction curve obtained by changing the value of Do.
Figure 14:
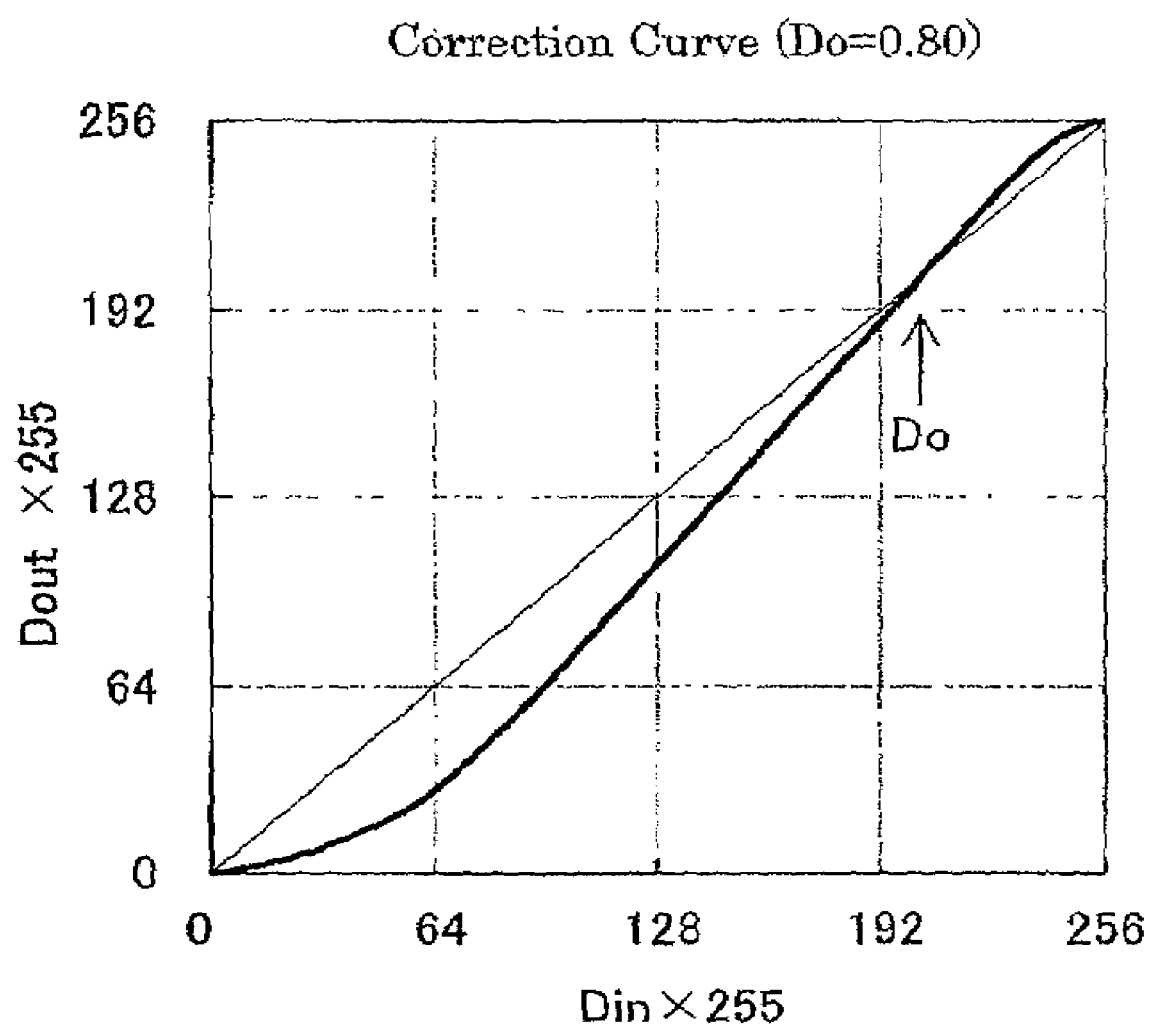
FIG. 14 is a graph (2) showing an example of a correction curve obtained by changing the value of Do.

The $1^{st}$ correction curve changes variously by changing the gradation value Do which serves as a center gradation value in correcting a lowering of contrast caused by illumination. Generally, if the value of Do is small, there is obtained such a $1^{st}$ correction curve as shown in FIG. 13, and the projection screen looks whitish, affording a light tone. On the other hand, if the value of Do is made large, there is obtained such a $1^{st}$ correction curve as shown in FIG. 14, in which the projection screen is blackish as a whole and the gradation change in the low gray scale (gradation) region further decreases (what is called collapse of the low gray scale (gradation) region becomes conspicuous). By setting the value of Do at an appropriate value it is possible to make such a correction as sharpness is most emphasized with little change in the entire brightness of projected image as compared with that before correction. As a result of experimental evaluation it turned out that a Do value near a middle gray scale (gradation) (0.25≦Do≦0.50 or so) was suitable.

Figure 15:
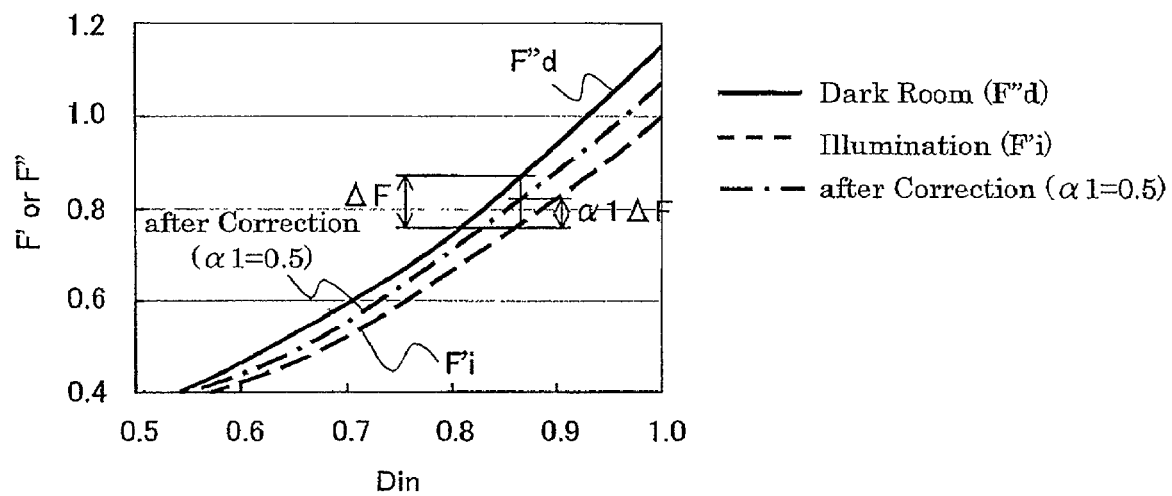
FIG. 15 is a graph for explaining how to adjust the amount α1 of correction of a $1^{st}$ correction curve.

Further, as shown in FIG. 15, the amount of correction can be adjusted by multiplying the amount of correction ΔF by α1 (0≦α1≦1). This is for preventing an unnatural image reproduction caused by an excessive correction. The equation (7) of Dout1 in adjusting the amount of correction becomes as follows:

$$Dout1=[(1+\alpha 1 Yi/Yw)Din^{\gamma}-(\alpha 1 \cdot Yi/Yw)Do^{\gamma}]^{1/\gamma} \quad (8)$$

Therefore, the 1$^{st}$ correction curves with respect to RGB colors are as follows:

$$D_R out1=[(1+\alpha 1 \cdot Yi/Yw)D_R in^{\gamma}-(\alpha 1 \cdot Yi/Yw)Do^{\gamma}]^{1/\gamma} \quad (9)$$

$$D_G out1=[(1+\alpha 1 \cdot Yi/Yw)D_G in^{\gamma}-(\alpha 1 \cdot Yi/Yw)Do^{\gamma}]^{1/\gamma} \quad (10)$$

$$D_B out1=[(1+\alpha 1 \cdot Yi/Yw)D_B in^{\gamma}-(\alpha 1 \cdot Yi/Yw)Do^{\gamma}]^{1/\gamma} \quad (11)$$

Multiplying the amount of correction by $\alpha 1$ eventually corresponds to multiplying the luminance of illumination, Yi, by $\alpha 1$. It is preferable that the value of $\alpha 1$ be within the range of $0.8 \leq \alpha 1 \leq 1$.

As shown in the above equations (9)–(11), the 1$^{st}$ correction curves are calculated (step 234), the processing flow returns to step 223 of FIG. 8, and, therefore, a correction curve calculation processing 2 is performed.

Correction Curve Calculation Processing 2

Figure 16:
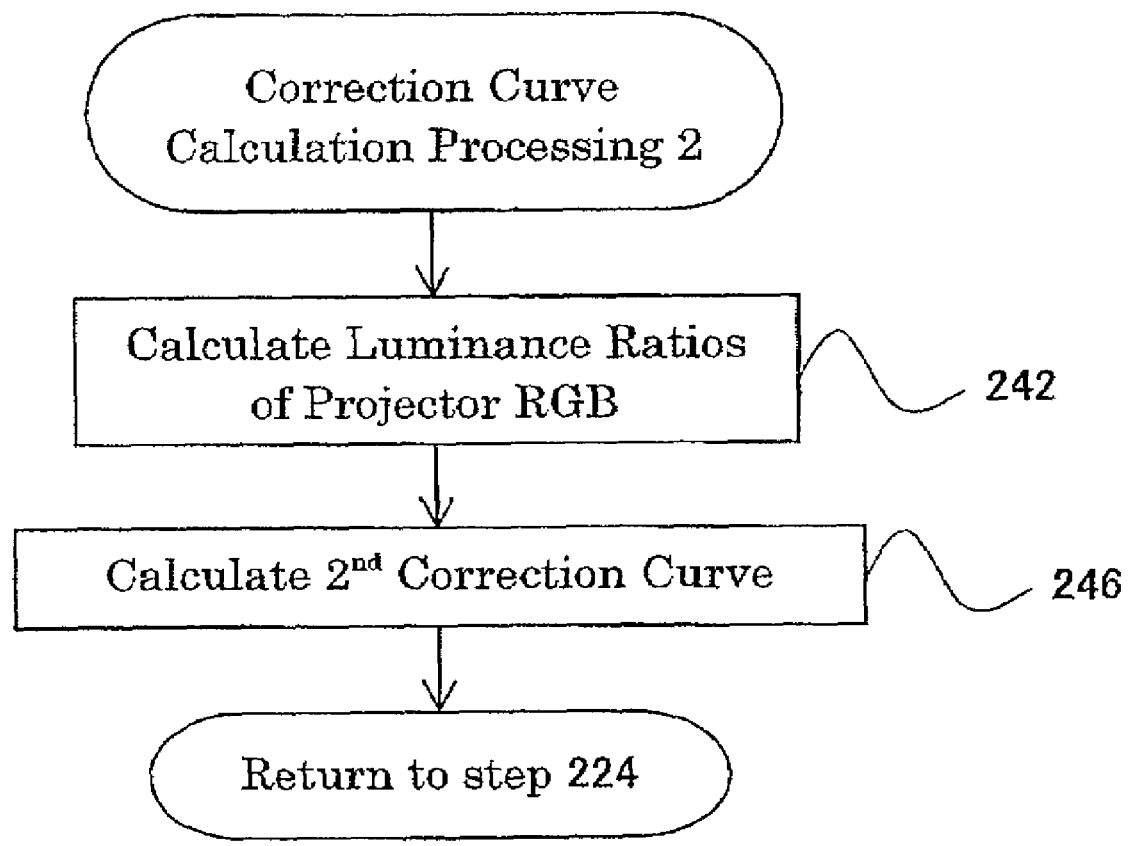
FIG. 16 is a flow chart for explaining a correction curve calculation processing 2 (a correction with respect to a change in color of projection plane)

(Correction with Respect to a Change in Color of Projection Plane);

Next, with reference to FIG. 16, a description is given about the correction curve calculation processing 2.

First, in the correction curve calculation processing 2, before using the projector 20 according to the present invention, R (red), G (green), B (blue), and bk (black) colors are outputted to a reference projection plane from the projector (image display device) 20 in a dark surround and a luminance value of reflected light of each such color output reflected by the reference projection plane is measured by the optical sensor 170 and is stored in the device characteristic storage memory 160. As the reference projection plane there may be selected a projection plane whose reflectance in the visible light region is close to 1, such as a standard diffusion plate.

Before using the projector 20 according to the present invention, in a dark surround, R (red), G (green), B (blue), and bk (black) colors are outputted to a projection plane to be corrected and a luminance value of reflected light of each such color output reflected by the projection plane is measured by the optical sensor 170.

In the correction curve calculation processing 2, first, luminance ratios of RGB colors on projection planes are calculated on the basis of the measured values (luminance values of reflected light of R (red), G (green), B (blue), and bk (black) colors reflected by the reference projection plane, and luminance values of reflected light of R (red), G (green), B (blue), and bk (black) colors reflected by the projection plane to be corrected) (step 242), which calculation is performed in accordance with the following equations:

$$y_R=(Y_R-Ybk)/(Y_G-Ybk) \quad (12)$$

$$y_G=(Y_G-Ybk)/(Y_G-Ybk)=1 \quad (13)$$

$$y_B=(Y_B-Ybk)/(Y_G-Ybk) \quad (14)$$

In the above equations, $Y_R$, $Y_G$, $Y_B$, and Ybk represent luminances of R, G, B, and bk colors in the projector and $y_R$, $y_G$, and $y_B$ represent luminance ratios of RGB. In this case, $y_G$ is always 1 because the ratios are based on the luminance of G. Luminance ratios $y_{R0}$, $y_{G0}$, and $y_{B0}$ of RGB on the reference projection plane are also calculated in the same manner.

Next, a 2$^{nd}$ correction curve is calculated (step 246). Primary colors (RGB) of the projector are not influenced by a change in chromaticity caused by a change of projection plane in comparison with secondary and tertiary colors. Therefore, if the luminance ratios $y_R$, $y_G$, and $y_B$ of the projection plane concerned are corrected so as to coincide with the luminance ratios $y_{R0}$, $y_{G0}$, and $y_{B0}$ of the reference projection plane, a change in chromaticity caused by a difference of projection plane is corrected in all colors. If digital input values of RGB before correction are normalized in the range of 0 to 1 as $D_R$in2, $D_G$in2, and $D_B$in2, respectively, and digital input values of RGB after correction are normalized in the range of 0 to 1 as $D_R$out2, $D_G$out2, and $D_B$out2, respectively, there are obtained the following correction curve equations:

$$D_R out2 = [y_R'/\max(y_R', y_G', y_B')]^{1/\gamma} \times D_R in2, \; y_R'=y_{R0}/y_R \quad (15)$$

$$D_G out2 = [y_G'/\max(y_R', y_G', y_B')]^{1/\gamma} \times D_G in2, \; y_G'=y_{G0}/y_G=1 \quad (16)$$

$$D_B out2 = [y_B'/\max(y_R', y_G', y_B')]^{1/\gamma} \times D_B in2, \; y_B'=y_{B0}/y_B \quad (17)$$

In the above equations, $\max(y_R', y_G', y_B')$ represent the maximum value among $y_R'$, $y_G'$, and $y_B'$. In this way, a change in chromaticity caused by a difference of projection plane can be corrected colorimetrically.

It is thus possible to correct colorimetrically a change in chromaticity caused by a difference of projection plane, but in case of adjusting the amount of correction, $\alpha 3$ ($0<\alpha 3<1$), taking the adaptability of the human eyes and the effect of contrast into account, there are obtained the following correction curve equations:

$$D_R out2=[1-\alpha 3\{1-y_R'/\max(y_R', y_G', y_B')\}]^{1/\gamma} \times D_R in2 \quad (18)$$

$$D_G out2=[1-\alpha 3\{1-y_G'/\max(y_R', y_G', y_B')\}]^{1/\gamma} \times D_G in2 \quad (19)$$

$$D_B out2=[1-\alpha 3\{1-y_B'/\max(y_R', y_G', y_B')\}]^{1/\gamma} \times D_B In2 \quad (20)$$

Here, $$\Delta R\text{gain}=y_R'/\max(y_R', y_G', y_B')$$

$$\Delta G\text{gain}=y_G'/\max(y_R', y_G', y_B')$$

$$\Delta B\text{gain}=y_B'/\max(y_R', y_G', y_B')$$

Then, the equations (18)–(20) are expressed as follows:

$$D_R out2=\{1-\alpha 3(1-\Delta R\text{gain})\}^{1/\gamma} \times D_R in2 \quad (21)$$

$$D_G out2=\{1-\alpha 3(1-\Delta G\text{gain})\}^{1/\gamma} \times D_G in2 \quad (22)$$

$$D_B out2=\{1-\alpha 3(1-\Delta B\text{gain})\}^{1/\gamma} \times D_B in2 \quad (23)$$

If the color of the projection plane obtained by measurement is corrected 100% ($\alpha 3=1$), an exact correction is performed colorimetrically. In the presence of an external illumination, however, since the color of the projection plane is present around a projected image, the correction looks as if it were stronger than the actual correction due to a color contrast between the projected image and the projection plane and the effect of the eyes' adaptability to the external illumination. The amount of correction is adjusted to eliminate such a phenomenon. It is necessary that the amount of correction, $\alpha 3$, be adjusted while the evaluation of image is made actually under each environment. The value of $\alpha 3$ is preferably in the range of 0.5 to 1.0.

As shown in the above equations (21)–(23), the 2$^{nd}$ correction curve is calculated (step 246), the processing flow returns to step 224 of FIG. 8, and then, the correction curve calculation processing 3 is performed.

Here, the correction curve calculation processing 1 and the correction curve calculation processing 2 are the processes for relatively correcting inputted values. Namely, with respect to the equations (9)–(11) for the 1$^{st}$ correction curve and the equations (21)–(23) for the 2$^{nd}$ correction curve, the output values are obtained by multiplying the inputted values by correction parameters. Therefore, the order of the correction curve calculation processing 1 and the correction curve calculation processing 2 can be exchanged. Namely, Step 222 of FIG. 8 and Step 223 of FIG. 8 can be exchanged.

Correction Curve Calculation Processing 3

Figure 17:
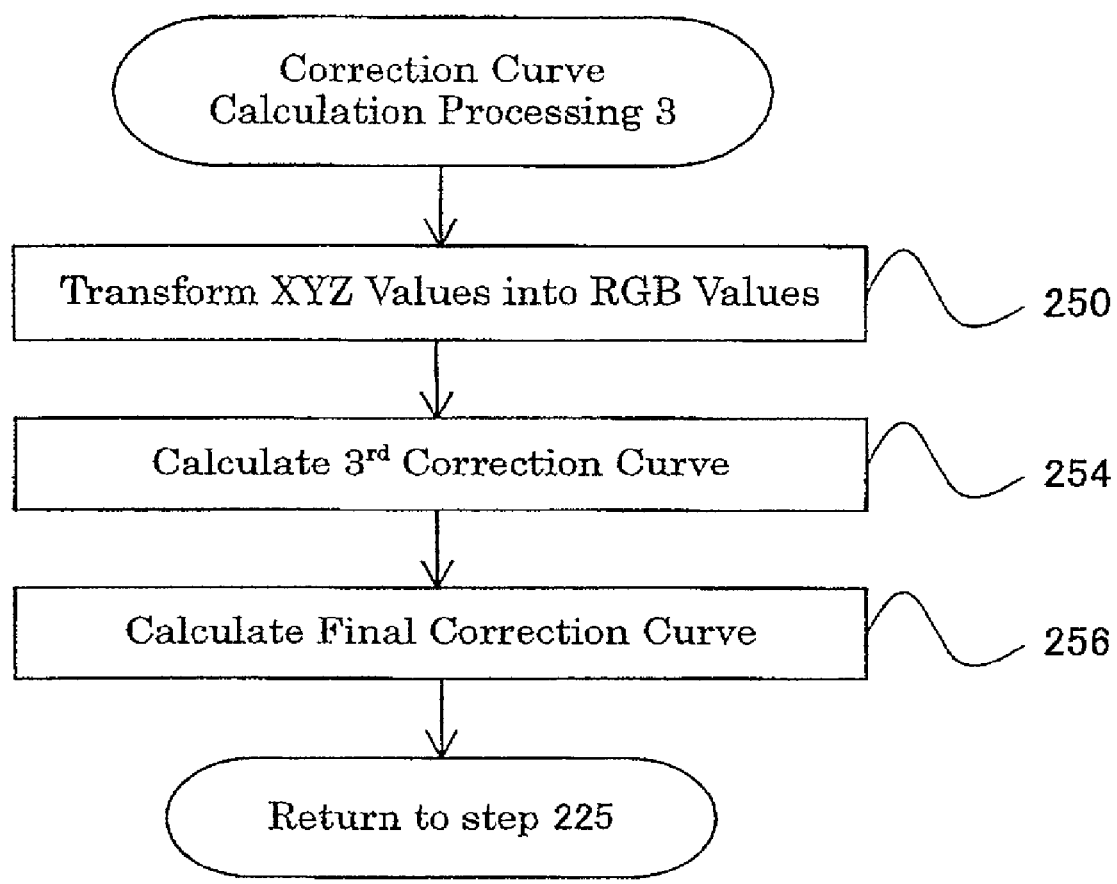
FIG. 17 is a flow chart for explaining a correction curve calculation processing 3 (a correction with respect to a change in color of external illumination)

(Correction with Respect to a Change in Color of External Illumination);

Next, with reference to FIG. 17, a description will be given about the correction curve calculation processing 3.

In the correction curve calculation processing 3, R (red), G (green), B (blue), and bk (black) are outputted beforehand from the projector (image display device) 20 in a dark surround, then XYZ values of reflected lights obtained by reflection of those color outputs from the screen are measured with an optical sensor 170 and are stored in the device characteristic storage memory 160. In the absence of output from the projector, XYZ values of reflected light of the external illumination from the screen 10 are measured.

In the correction curve calculation processing 3, first, the measured values (the XYZ values of the colors of the projector) are transformed into RGB values of the projector (step 250). In this embodiment, for representing the color of the external illumination in terms of RGB values, a matrix M for the transformation between the projector RGB values and XYZ values is determined from the XYZ values of the colors of the projector. The matrix M and transformation expressions are as follows:

$$\begin{pmatrix} X \\ Y \\ Z \end{pmatrix} = \begin{pmatrix} X_{bk} \\ Y_{bk} \\ Z_{bk} \end{pmatrix} + M \begin{pmatrix} r \\ g \\ b \end{pmatrix} \quad (24)$$

$$M = \begin{pmatrix} X_R - X_{bk} & X_G - X_{bk} & X_B - X_{bk} \\ Y_R - Y_{bk} & Y_G - Y_{bk} & Y_B - Y_{bk} \\ Z_R - Z_{bk} & Z_G - Z_{bk} & Z_B - Z_{bk} \end{pmatrix} \quad (25)$$

$$\begin{pmatrix} r \\ g \\ b \end{pmatrix} = \begin{pmatrix} D_R^\gamma \\ D_G^\gamma \\ D_B^\gamma \end{pmatrix} \quad (26)$$

In the above expressions, Xc, Yc and Zc (c=R, G, B, bk) represent XYZ values of the colors R, G, B and bk in the projector, $D_R$, $D_G$, and $D_B$ represent normalized values obtained by standardizing digital input values (0–255) of RGB into the range from 0 to 1, and γ represents a tone curve characteristic of the projector. As explained regarding the correction curve calculation processing 1, the value of γ is actually measured and in this embodiment, γ is set at 2.2 as an example.

If XYZ values of illumination are assumed to be Xi, Yi and Zi, RGB values, $r_i$, $g_i$, and $b_i$ in the case of representing the illumination color as a mixed color of RGB in the projector are as follows:

$$\begin{pmatrix} r_i \\ g_i \\ b_i \end{pmatrix} = M^{-1} \begin{pmatrix} X_i \\ Y_i \\ Z_i \end{pmatrix} \quad (27)$$

Next, a 3$^{rd}$ correction curve is calculated by using $r_i$, $g_i$, and $b_i$ (step 254). Reproduction of a completely equal color is realized by substracting $r_i$, $g_i$, and $b_i$ obtained in the expression (27) as offset from the RGB outputs in the projector. But this method is not a practical method because the projector gradation collapses largely.

Figure 18:
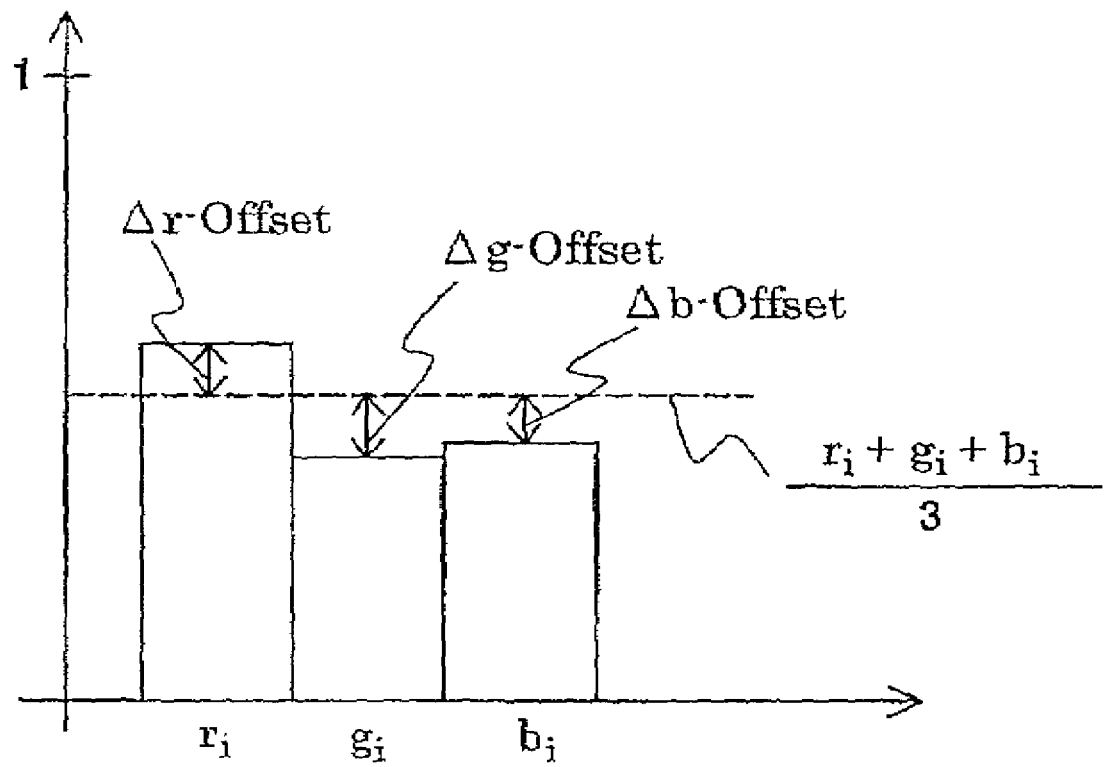
FIG. 18 is a diagram for explaining the principle of the $3^{rd}$ correction curve.

In view of the above point, in this embodiment there is adopted such a method as shown in FIG. 18 in which differences ΔRoffset, ΔGoffset, and ΔBoffset from a means value of $r_i$, $g_i$, and $b_i$ are subtracted as offset. Therefore, the color generated by superimposing the offset color on the color of illumination corresponds to that of gray of the projector.

In this way, it is colorimetrically possible to correct the influence of the illumination color, but in the case of adjusting the amount of correction while taking into account the adaptability of the human eyes and the effect of contrast, the values of ΔRoffset, ΔGoffset, and ΔBoffset are multiplied by α2(0<α2<1). If 100% (α2=1) correction is applied to the illumination color obtained by measurement, there is made a proper correction colorimetrically, but an unnatural image reproduction may result due to an overcorrection. The amount of correction is adjusted for eliminating this phenomenon. It is necessary that the amount of correction α2 be adjusted while making image evaluation actually in each environment. As the value of α2, a value in the range of 0.2 to 0.5 is preferable.

The above correction processing is represented by the following expressions, provided only expressions of R will be given for the simplification of explanation. Here, r, g, b represent the RGB outputs of the projector, and r', g', b' represent the RGB outputs of the projector after the correction processing. Namely, on the basis of the equation (26), by adjusting the R output of the projector:

$$r(D_R)(=D_R^\gamma) \quad (28)$$

with using the amount of correction α2, the R output of the projector after the correction: r'($D_R$) is represented by the following expressions:

$$r'(D_R)=D_R^\gamma - \alpha 2 \Delta R\text{offset} \quad (29)$$

$$\Delta R\text{offset}=r_i-(r_i+g_i+b_i)/3$$

If $D_R$in3 represents inputted value before correction, and if $D_R$out represents inputted value after correction, the 3$^{rd}$ correction curve is represented by the following expression:

$$r(D_R\text{out})=r'(D_R\text{in}3) \quad (30)$$

By using the equations (29) and (30), the 3$^{rd}$ correction curve is represented by the following expression:

$$D_R\text{out}=(D_R\text{in}3^\gamma - \alpha 2 \Delta R\text{offset})^{1/\gamma} \quad (31)$$

In the same way, $D_G$out and $D_B$out are represented by the following expressions:

$$D_G\text{out}=(D_G\text{in}3^\gamma - \alpha 2 \Delta G\text{offset})^{1/\gamma} \quad (32)$$

$$D_B\text{out}=(D_B\text{in}3^\gamma - \alpha 2 \Delta B\text{offset})^{1/\gamma} \quad (33)$$

A final correction curve is obtained by connecting the $1_{st}$ correction curve, the $2^{nd}$ correction curve and the $3^{rd}$ correction curve, which are calculated as explained before. Namely, if with respect to the equations (9)–(11) and the equations (21)–(23)

$$D_R\text{in}2 = D_R\text{out}1$$

$$D_G\text{in}2 = D_G\text{out}1$$

$$D_B\text{in}2 = D_B\text{out}1$$

and if with respect to the equations (21)–(23) and the equations (31)–(33)

$$D_R\text{in}3 = D_R\text{out}2$$

$$D_G\text{in}332\ D_G\text{out}2$$

$$D_B\text{in}3 = D_G\text{out}2$$

the final correction curves are represented by the following expressions:

$$D_R\text{out} = [\{1-\alpha 3(1-R\text{gain})\} \times \{(1+\alpha 1 \cdot Yi/Yw) D_R\text{in}^\gamma - (\alpha 1 \cdot Yi/Yw) Do^\gamma\} - \alpha 2 \Delta R\text{offset})]^{1/\gamma} \quad (34)$$

$$D_G\text{out} = [\{1-\alpha 3(1-\Delta G\text{gain})\} \times \{(1+\alpha 1 \cdot Yi/Yw) D_G\text{in}^\gamma - (\alpha 1 \cdot Yi/Yw) Do^\gamma\} - \alpha 2 \Delta G\text{offset})]^{1/\gamma} \quad (35)$$

$$D_R\text{out} = [\{1-\alpha 3(1-\Delta B\text{gain})\} \times \{(1+\alpha 1 \cdot Yi/Yw) D_B\text{in}^\gamma - (\alpha 1 \cdot Yi/Yw) Do^\gamma\} - \alpha 2 \Delta B\text{offset})]^{1/\gamma} \quad (36)$$

After the calculations of the expressions (34)–(36), if $D_R$out, $D_G$out or $D_B$out is less than 0 (zero), $D_R$out, $D_G$out or $D_B$out is set at 0 (zero). On the other hand, if $D_R$out, $D_G$out or $D_B$out is greater than 1, $D_R$out, $D_G$out or $D_B$out is set at 1.

Figure 19:
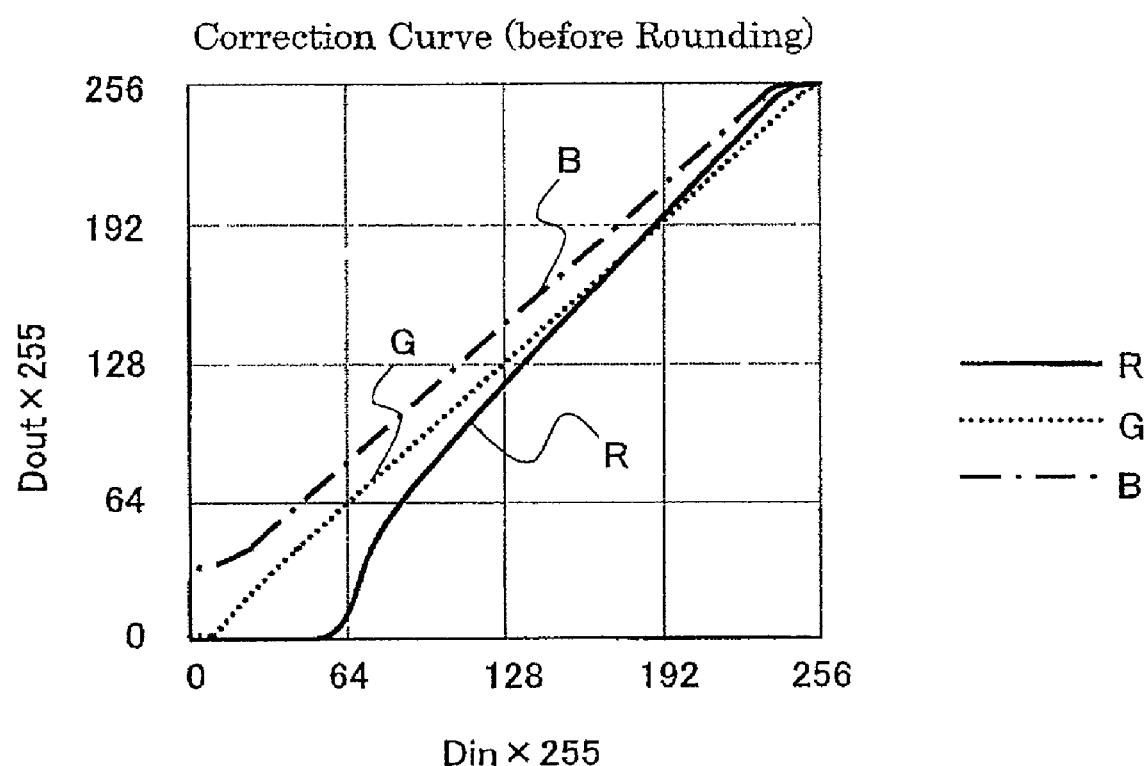
FIG. 19 is a graph showing an example of a correction curve before a rounding process.

An example of the final correction curve is shown in FIG. 19.

As shown in the above equations (34)–(36), the final correction curves are obtained (step 256), and therefore, a correction curve rounding process 1 with respect to step 225 of FIG. 8 is performed.

Correction Curve Rounding Process 1

Next, a correction curve rounding process 1 is executed (step 225).

As shown in FIG. 19, with respect to the correction curve expressed by the equation (34), in a low gray scale (gradation) region and in a high gray scale (gradation) region, there are gradation levels in which Dout remains 0 (zero). Therefore, a correction curve rounding process is performed with respect to the correction curve in accordance with the following procedures. First, Dout4 is calculated from Dout by using the following equations:

$$D\text{out}4 = [D\text{out} - |(D\text{out}-D\text{in})|^\beta](D\text{out} > D\text{in}) \quad (37)$$

$$D\text{out}4 = [D\text{out} + |(D\text{out}-D\text{in})|^\beta](D\text{out} < D\text{in}) \quad (38)$$

In the above expressions (37) and (38), β is a parameter indicating the intensity of the rounding process. In accordance with the evaluation result which is obtained by actually observing image, a suitable value of β is about 1.5. With respect to the equations (37) and (38), there can be generated a correction curve free of any gray scale (gradation) with Dout remaining at 0. After the correction curve rounding process 1 is completed, a correction curve rounding process 2 is performed.

Correction Curve Rounding Process 2

Next, a correction curve rounding process 2 is executed (step 226).

In the correction curve rounding process 2, with respect to each of various points of the equations (37) and (38), a means is taken of a total of five points which are each point plus two points on the front side and two points on the rear side of each point.

For example, if Din×255=128, $$D\text{out}5(128) = [D\text{out}4(112) + D\text{out}4(120) + D\text{out}4(128) + D\text{out}4(136) + D\text{out}4(144)]/5 \quad (39)$$

The correction curve can be smoothed by performing the correction curve rounding process 2

With respect to the following four points, i.e. Din×255=0, 8, 248, 255, $$D\text{out}5(0) = D\text{out}4(0) \quad (40)$$

$$D\text{out}5(8) = [D\text{out}4(0) + D\text{out}4(8) + D\text{out}4(16)]/3 \quad (41)$$

$$D\text{out}5(248) = [D\text{out}4(240) + D\text{out}4(248) + D\text{out}4(255)]/3 \quad (42)$$

$$D\text{out}5(255) = D\text{out}4(255) \quad (43)$$

Therefore, after the correction curve rounding process 2 is completed, a correction curve rounding process 3 is performed.

Correction Curve Rounding Process 3

Next, a correction curve rounding process 3 is executed (step 227).

In the correction curve rounding process 3, Dout6 is calculated by using the following equations:

$$D\text{out}6 = D\text{in} + (D\text{out}5 - D\text{in})[1 - \{(0.25 - D\text{in})/0.25\}^\theta] \\ (D\text{in} \times 255 < 64) \quad (44)$$

$$D\text{out}6 = D\text{in} + (D\text{out}5 - D\text{in})[1 - \{(D\text{in} - 0.75)/0.25\}^\theta] \\ (D\text{in} \times 255 > 192) \quad (45)$$

The "Dout6" is the final result of correction.

Figure 20:
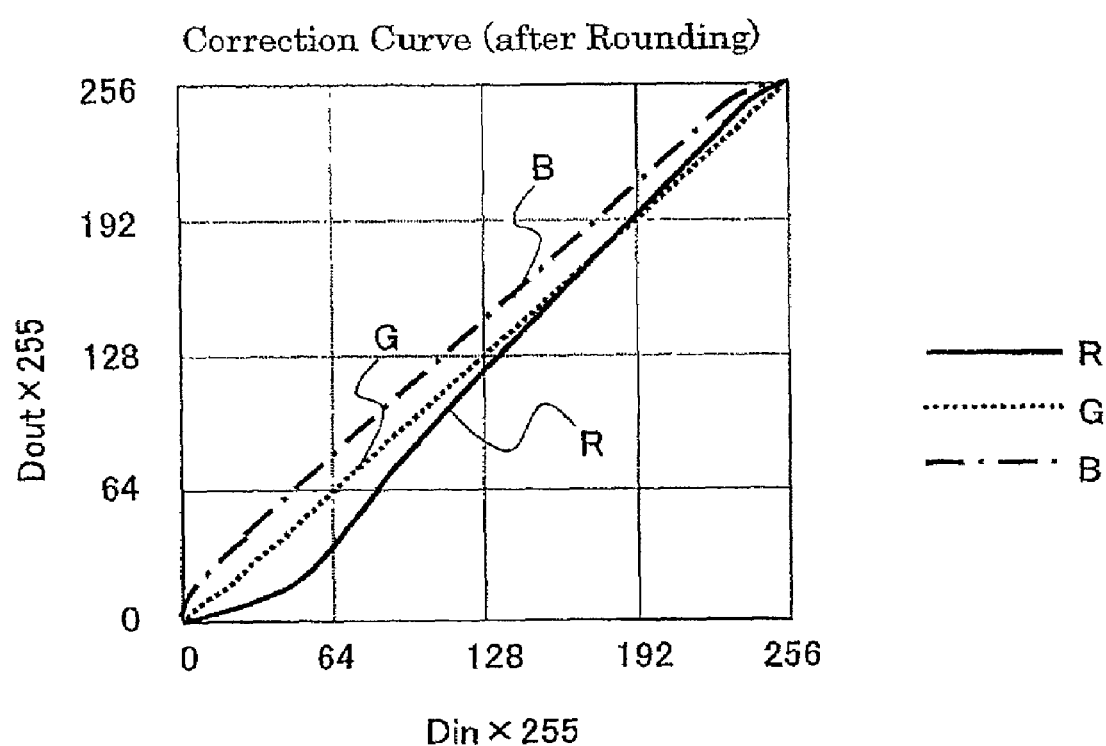
FIG. 20 is a graph showing an example of a correction curve after a rounding process.

The result is shown in FIG. 20. As shown in FIG. 20, the correction is not performed in the vicinity of Din'×255=0 or Din×255=255, and therefore, the maximum luminance of the projector and the contrast are maintained. In the above equations (44) and (45), "θ" represents the parameter for adjusting the degree of attenuation of the correction amount in the vicinity of Din×255=0 or Din×255=255. In accordance with the evaluation result which is obtained by actually observing image, a suitable value of θ is about 5.0.

If Dout5(0) and Dout5(255) are zero,

Dout6=Dout5 without performing the correction curve rounding process 3 (step 227).

After the correction curve rounding process 3 is completed, the processing flow returns to step 228.

Although in this embodiment one-dimensional color correction tables for the second color corrector 120 are generated successively and a color correction is made using a newly generated one-dimensional color correction table, there also may be adopted a construction such that a plurality of one-dimensional color correction tables are stored in advance and a color correction is performed using a predetermined one-dimensional color correction table according to an external environment. The reason is that in the case of a one-dimensional color correction table there is not required a large memory capacity in comparison with a three-dimensional color correction table and that therefore even pre-storage of plural one-dimensional color correction tables would pose no problem.

(2-2) Adjustment of the Color Temperature

Figure 21:
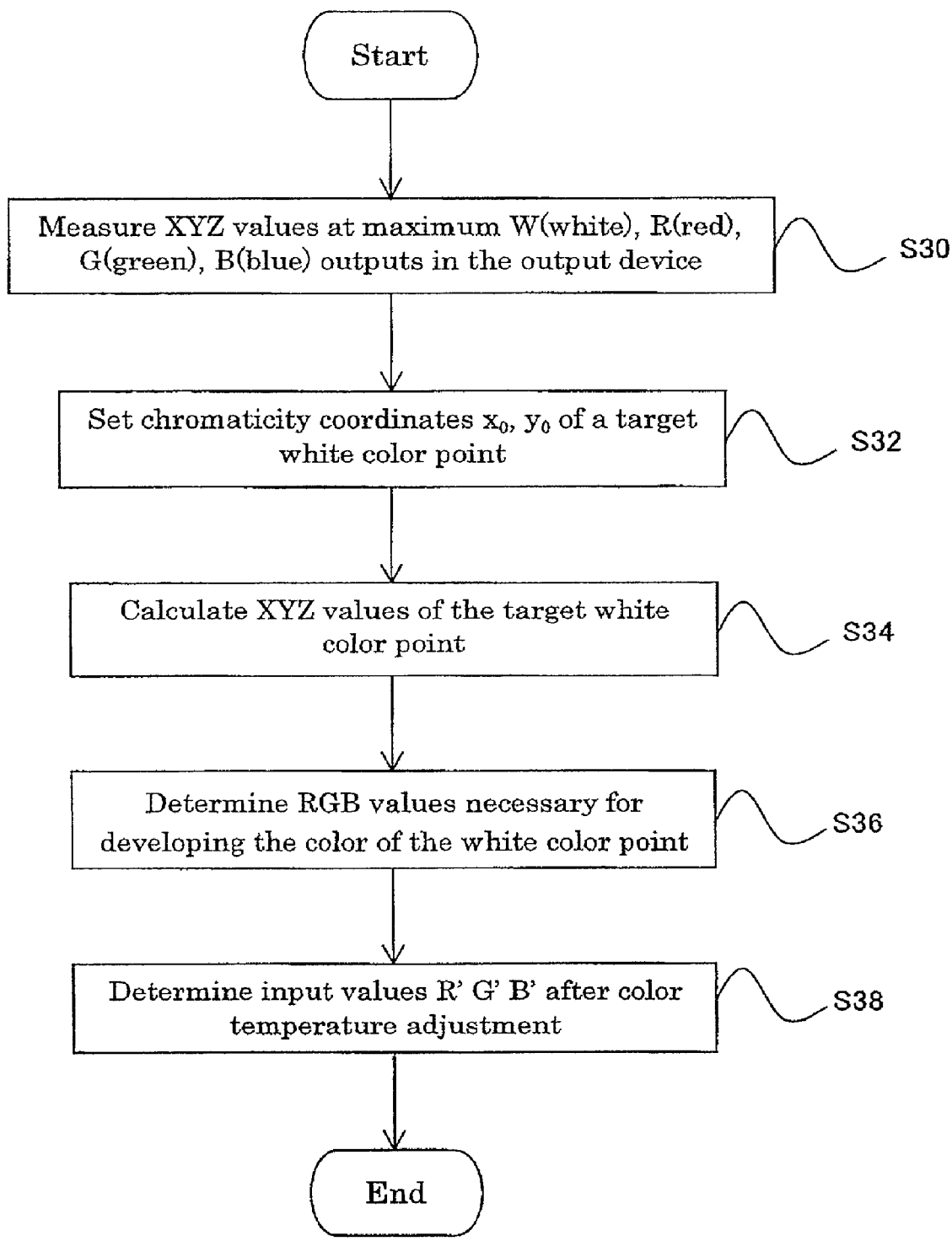
FIG. 21 is a flow chart for explaining a color correction table generating process which can adjust the color temperature.

Referring now to FIG. 21, a color correction table generating process which can adjust the color temperature is described. In the previous paragraph (2-1) there has been described an example in which the second color correction table generator 150 again carries out a color correction table generation/rewrite processing and the projector displays an image while making reference to the rewritten color correction table, taking into account the case where the brightness or color of an external illumination or the color of the projection plane changes. In this paragraph (2-2) a description will be given about the case where the second color correction table generator 150 generates a color correction table which can adjust the color temperature.

As shown in FIG. 21, when the outputs of W (white), R (red), G (green), and B (blue) from the projector are maximum outputs, the second color correction table generator 150 measures XYZ values using the optical sensor 150 (S30).

It is assumed that XYZ values are $X_R$, $Y_R$, $Z_R$; $X_G$, $Y_G$, $Z_G$; and $X_B$, $Y_B$, $Z_B$, when the outputs of R, G, and B are maximum outputs, respectively. Assuming that the projector possesses an ideal output characteristic represented by a predetermined gradation characteristic parameter γ, the following relationship is established between inputted RGB values and XYZ values:

$$\begin{bmatrix} X \\ Y \\ Z \end{bmatrix} = \begin{bmatrix} X_R & X_G & X_B \\ Y_R & Y_G & Y_B \\ Z_R & Z_G & Z_B \end{bmatrix} \times \begin{bmatrix} r \\ g \\ b \end{bmatrix}, \begin{array}{l} r = (R/255)^\gamma \\ g = (G/255)^\gamma \\ b = (B/255)^\gamma \end{array}$$

Next, there are set chromaticity coordinates $x_0$, $y_0$ of a target white color point (S32).

Then, XYZ values of the target white point are calculated (S34). More specifically, $X_0$, $Y_0$, $Z_0$ values are determined from the values of $Y_R$, $Y_G$, $Y_B$ obtained in S30 and the $x_0$, $y_0$ values set in S32 and in accordance with the following equations:

$$Y_0 = Y_R + Y_G + Y_B$$

$$X_0 = Y_0 \times x_0 / y_0$$

$$Z_0 = Y_0 \times (1 - x_0 - y_0) / y_0$$

Next, RGB values ($R_0$, $G_0$, $B_0$) necessary for developing the color of the white color point is determined (S36).

The values of $R_0$, $G_0$, $B_0$ are determined as follows:

$$\begin{bmatrix} r_0 \\ g_0 \\ b_0 \end{bmatrix} = \begin{bmatrix} X_R & X_G & X_B \\ Y_R & Y_G & Y_B \\ Z_R & Z_G & Z_B \end{bmatrix}^{-1} \times \begin{bmatrix} X_0 \\ Y_0 \\ Z_0 \end{bmatrix}$$

$$R_0 = 255 \times [r_0 / \max(r_0, g_0, b_0)]^{1/\gamma}$$

$$G_0 = 255 \times [g_0 / \max(r_0, g_0, b_0)]^{1/\gamma}$$

$$B_0 = 255 \times [b_0 / \max(r_0, g_0, b_0)]^{1/\gamma}$$

Where, max ($r_0$, $g_0$, $b_0$) stand for maximum values of $r_0$, $g_0$, $b_0$, and a matrix index −1 indicates that this matrix is an inverse matrix.

Thus, input values R', G', B' after color temperature adjustment are determined by the following equations (S38):

$$R' = (R_0/255) \times R \quad (46)$$

$$G' = (G_0/255) \times G \quad (47)$$

$$B' = (B_0/255) \times B \quad (48)$$

In this way the second color correction table generator 150 generates a color temperature-adjustable color correction table in accordance with the equations (46) to (48). Then, on the basis of the color correction table thus constructed the second color corrector 120 makes a color temperature adjustment.

Although this embodiment is constructed in such a manner that one-dimensional color correction tables for the second color corrector 120 are generated successively and a color correction is made using a newly generated one-dimensional color correction table, there also may be adopted a construction such that a plurality of one-dimensional color correction tables are stored in advance and a color correction is made using a predetermined one-dimensional color correction table according to a predetermined color temperature. The reason is that in the case of a one-dimensional color correction table there is not required such a large memory capacity as in the case of a three-dimensional color correction table and that therefore no problem arises even if plural one-dimensional color correction tables are stored in advance.

(2-3) Although in this embodiment both (2-1) "color correction taking changes in ambient light and projection plane into account" and (2-2) "color correction for adjusting the color temperature" have been described each independently as an example of "color correction taking changes in the external environment into account," the color correction may also be made using a one-dimensional color correction table for color temperature adjustment after a color correction has been made using a one-dimensional color correction table which takes changes in ambient light and projection plane into account.

(3) Color Correction in the Third Color Corrector 130

Figure 22:
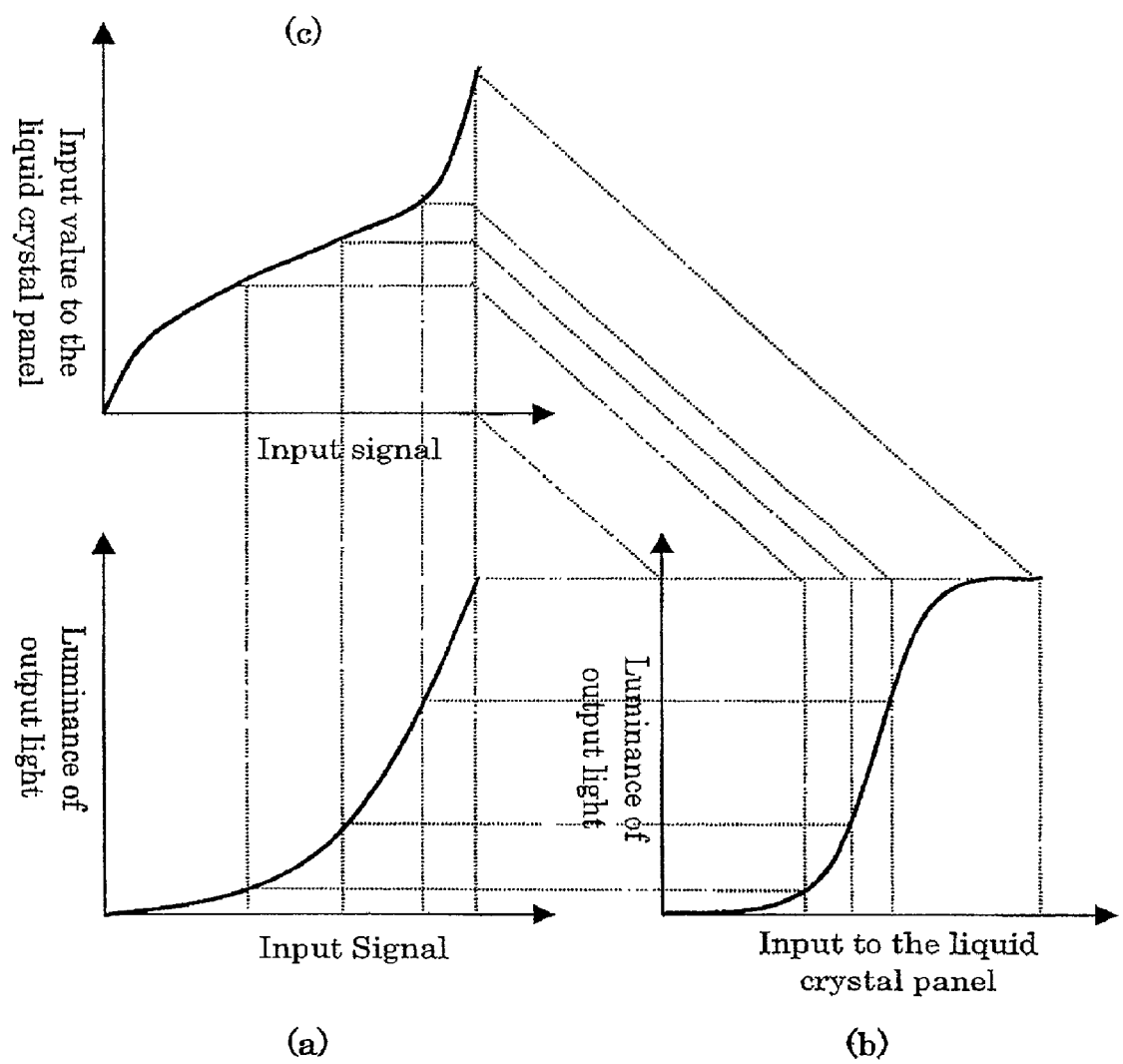
FIG. 22 is a diagram for explaining a color correction process carried out by a third color corrector 130.

Referring now to FIG. 22, the following description is provided about a color correction processing which is carried out by the third color corrector 130.

First, an output characteristic of the projector is set as shown in FIG. 22(a) and an input/output characteristic of a liquid crystal panel is measured as shown in FIG. 22(b). Then, as shown in FIG. 22(c), there are determined correlations between input signals and input values to the liquid crystal panel on the basis of FIGS. 22(a) and (b).

The third color corrector 130 adjusts the input value to the liquid crystal panel by reference to a color correction table which represents such correlations between input signals and input values to the liquid crystal panel as shown in FIG. 22(c).

Second Embodiment

Figure 2:
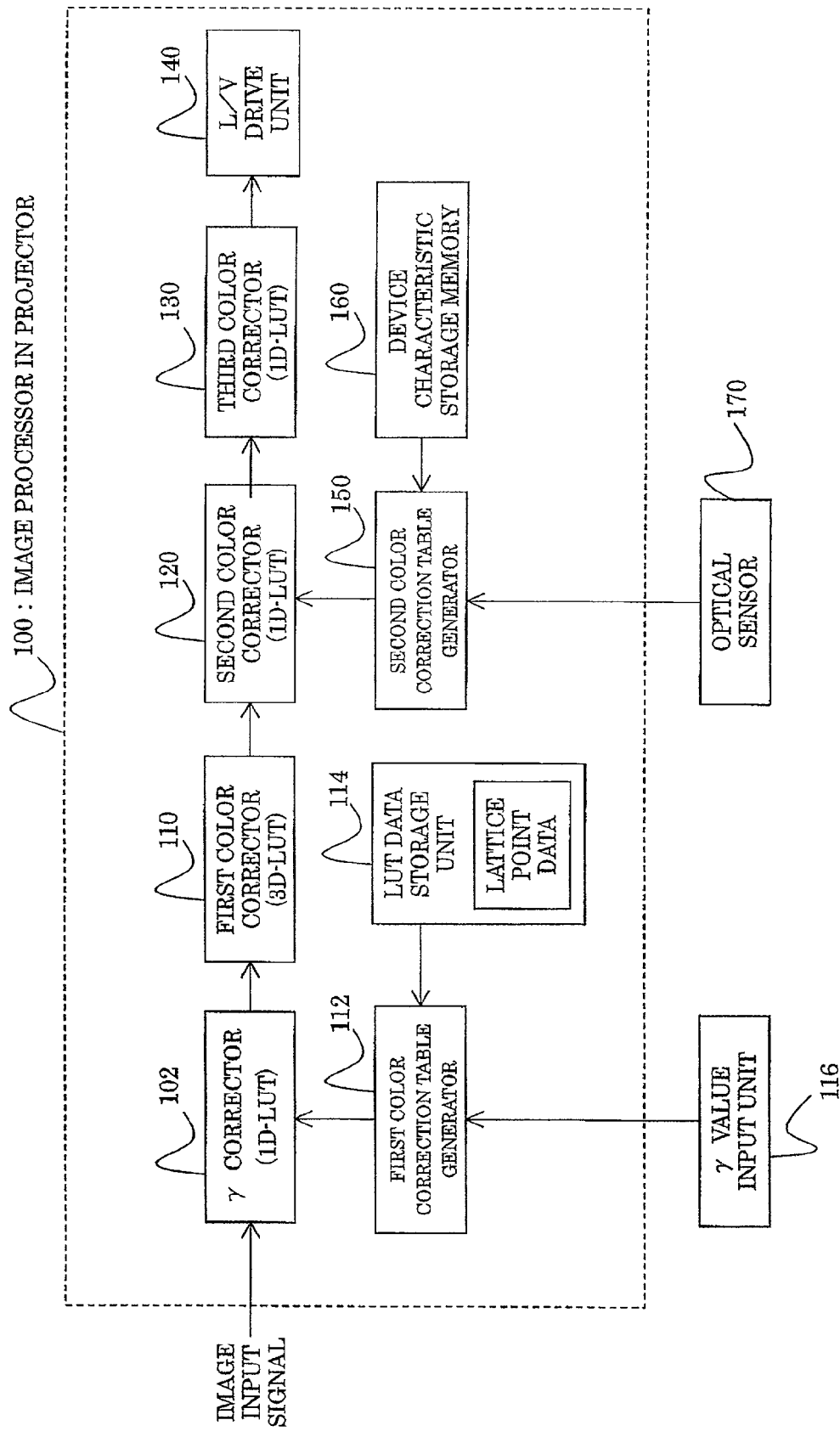
FIG. 2 is a functional block diagram of an image processor disposed within a projector according to a second embodiment of the present invention.

FIG. 2 is a functional block diagram of an image processor 100 disposed within a projector as an image display device according to a second embodiment of the present invention. As examples of the image display device according to the present invention there also are included a CRT and a liquid crystal display in addition to the projector.

The image processor 100 disposed within the projector according to the second embodiment is provided with a γ corrector 102 which rewrites lattice point data by reference to a one-dimensional color correction table generated by a first color correction table generator 112 and on the basis of an inputted γ value, a first color corrector 110 which makes a desired color correction by reference to a three dimensional color correction table (3D-LUT) constructed to perform a color matching for γ=2.2, a second color corrector 120 which makes a desired color correction on the basis of a color correction table generated by a second color correction table generator 150, a third color corrector 130 for adjusting an output characteristic of a liquid crystal light valve, and a L/V (light valve) drive section 140 for actuating the light crystal light valve to make a projection display of image.

The image processor 100 is also provided with a γ value input section 116 for inputting a γ value of the projector, a LUT data storage section 114 which stores lattice point data, and the first color correction table generator 112 which, in accordance with the inputted γ value, generates a one-dimensional color correction table for rewriting the lattice point data stored in the LUT data storage section 114.

As in the first embodiment, the image processor 100 is further provided with a device characteristic storage memory 160 for the storage of color characteristic information of the projector when outputted to a reference projection plane within a dark room, an optical sensor 170 for measuring the luminance of light emitted from the projector and reflected by the screen and light from the external illumination reflected by the screen, and a second color correction table generator 150 for generating a one-dimensional color correction table (1D-LUT) taking the influence of external illumination into account and on the basis of both colorimetric value obtained by the optical sensor 170 and information stored in the device characteristic storage memory.

Figure 3:
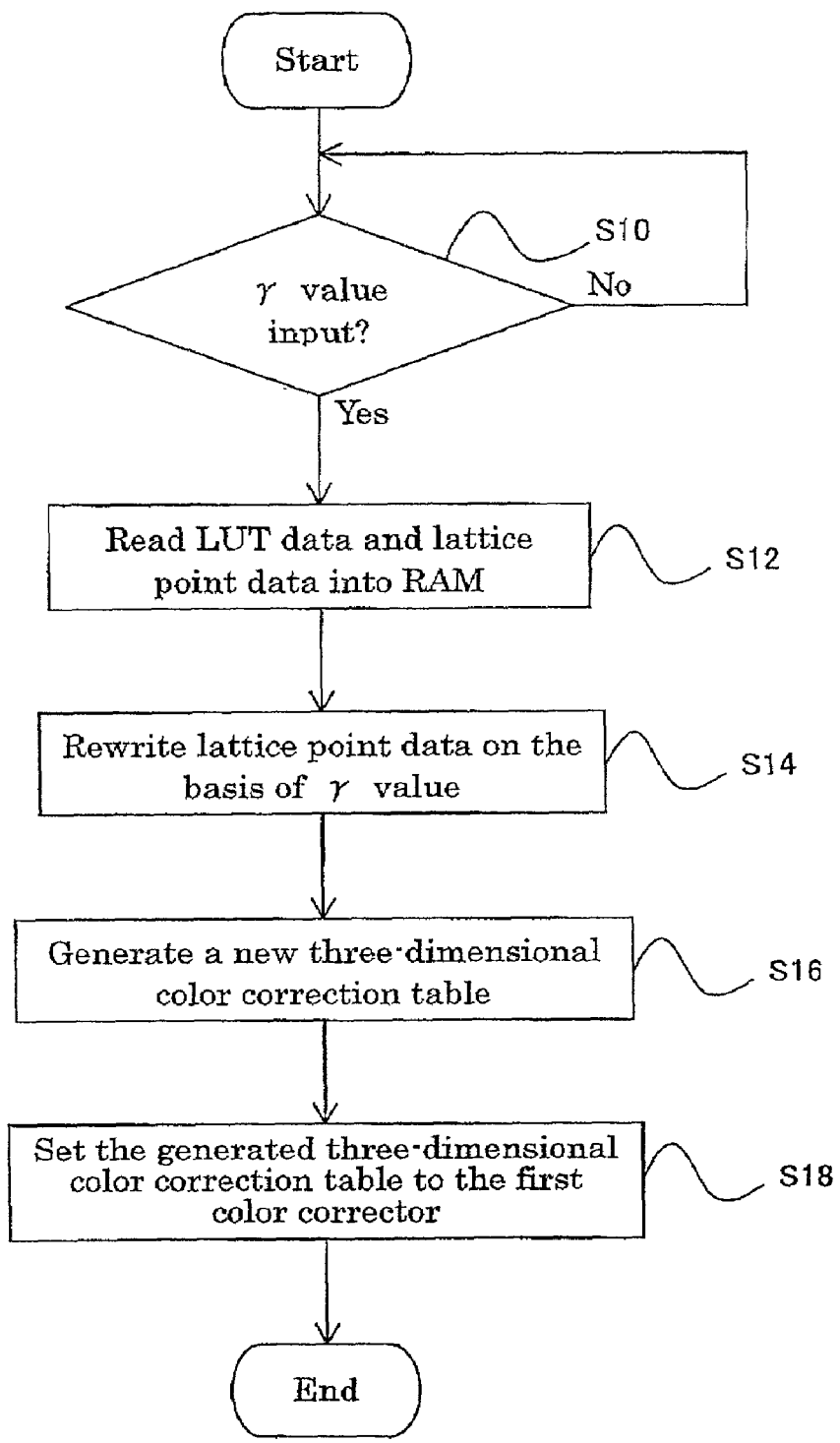
FIG. 3 is a flow chart for explaining a color correction table generating process carried out by a first color correction table generator 112.

In the image processor 100 of the second embodiment, the γ corrector 102 rewrites lattice point data on the basis of the inputted γ value as in steps S12 and S14 shown in FIG. 3 and the first color corrector 110 makes a desired color correction on the basis of the rewritten lattice point data and by reference to the three-dimensional color correction table (3D-LUT) for γ=2.2 (characteristic reference value). In this point the image processor 100 of this second embodiment is different from the image processor 100 of the first embodiment. Even with the γ corrector 102 and the first color corrector 110 provided as in the second embodiment, it is possible to carry out the same processing as that carried out by the first color corrector 110 in the first embodiment.

There also may be adopted a construction such that when γ=2.2 (characteristic reference value) is inputted from the γ value input section 116, an input image signal is fed to the first color corrector 110 directly without going through the γ corrector 102.

As to the construction and operation of each of the second color corrector 120, the third color corrector 130, the L/V drive section 140, the second color correction table generator 150, the device characteristic storage memory 160, and the optical sensor 170, explanations thereof will here be omitted because they are the same as in the first embodiment.

What is claimed is:

1. An image display device for applying an image processing on inputted image data, comprising:

a first color correction means for applying desired color correction to said inputted image data on the basis of a characteristic value of said image display device and by reference to a three-dimensional color correction table, said three-dimensional color correction table being configured for matching color characteristics of said image display device to reference color characteristics; and a second color correction means which performs a desired color correction to said inputted image data by reference to a one-dimensional color correction table, said one-dimensional color correction table being configured for color correction in accordance with an external environment.

2. An image display device according to claim 1, wherein said first color correction means is provided with a rewrite means for rewriting lattice point data of said three-dimensional color correction table on the basis of said characteristic value.

3. An image display device according to claim 1, wherein said one-dimensional color correction table used with said second color correction means is configured for adjusting the color temperature.

4. An image display device according to claim 1, wherein said one-dimensional color correction table used with said second color correction means is configured for color correction responsive to a change in brightness of an external illumination.

5. An image display device according to claim 1, wherein said one-dimensional color correction table used with said second correction means is configured for color correction responsive to a change in color of a projection plane.

6. An image display device according to claim 1, wherein said one-dimensional color correction table used with said second color correction means is configured for color correction responsive to a change in color of an external illumination.

7. An image display device according to claim 1, further comprising means for inputting said characteristic value.

8. An image display device according to claim 1, which is a projector.

9. An image display device according to claim 2, wherein a rewrite of the lattice point data by said rewrite means is not performed when said characteristic value is a characteristic reference value.

10. An image display method of applying an image processing an inputted image data, comprising:

a first color correction step applying desired color correction to said inputted image data on the basis of a characteristic value of said image display device and by reference to a three-dimensional color correction table, said three-dimensional color correction table being configured for matching color characteristics of said image display device to reference color characteristics; and a second color correction step for applying desired color correction to said inputted image data by reference to a one-dimensional color correction table, said one-dimensional color correction table being configured for color correction in accordance with an external environment.

11. A computer-readable medium containing therein a program of instructions which, when executed by a computer, cause the computer to apply perform an image processing on inputted image data, said image processing comprising:
   a first color correction processing for applying desired color correction to said inputted image data on the basis of a characteristic value of said image display device and by reference to a three-dimensional color correction table, said three-dimensional color correction table being configured for matching color characteristics of said image display device to reference color characteristics; and
   a second color correction processing for applying desired color correction to said inputted image data by reference to a one-dimensional color correction table, said one-dimensional color correction table being configured for color correction in accordance with an external environment.

* * * * *